United States Patent
Kang et al.

(10) Patent No.: US 12,017,348 B2
(45) Date of Patent: Jun. 25, 2024

(54) ROBOT AND ROBOT SYSTEM HAVING THE SAME

(71) Applicant: LG ELECTRONICS INC., Seoul (KR)

(72) Inventors: Hoseong Kang, Seoul (KR); Iljae Lee, Seoul (KR); Sunho Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/117,182

(22) Filed: Mar. 3, 2023

(65) Prior Publication Data

US 2023/0381981 A1    Nov. 30, 2023

Related U.S. Application Data

(63) Continuation of application No. 16/845,968, filed on Apr. 10, 2020, now Pat. No. 11,613,030.

(30) Foreign Application Priority Data

Dec. 6, 2019    (KR) .................. 10-2019-0161331

(51) Int. Cl.
*B25J 9/12* (2006.01)
*B25J 5/00* (2006.01)
*B25J 9/00* (2006.01)
*B25J 9/16* (2006.01)
*B25J 19/00* (2006.01)
(Continued)

(52) U.S. Cl.
CPC ............. *B25J 19/005* (2013.01); *B25J 5/007* (2013.01); *B25J 9/0009* (2013.01); *B25J 9/161* (2013.01); *B25J 19/022* (2013.01); *B25J 9/12* (2013.01); *B25J 11/009* (2013.01)

(58) Field of Classification Search
CPC ....... C07F 7/1892; C01B 39/48; C01B 39/04; C01B 39/46; B01J 29/041; B01J 29/7007; C01P 2006/17
See application file for complete search history.

(56) References Cited

U.S. PATENT DOCUMENTS

| | | | |
|---|---|---|---|
| 10,165,704 B2 * | 12/2018 | Matsunaga | ............. B60L 50/70 |
| 11,069,082 B1 | 7/2021 | Ebrahimi Afrouzi et al. | |
| 11,144,057 B1 | 10/2021 | Ebrahimi Afrouzi et al. | |

(Continued)

FOREIGN PATENT DOCUMENTS

KR    10-0919765 B1    10/2009

OTHER PUBLICATIONS

Zhang et al., Battery swapping and wireless charging for a home robot system with remote human assistance, 2013, IEEE, pg. (Year: 2013).*

(Continued)

*Primary Examiner* — McDieunel Marc
(74) *Attorney, Agent, or Firm* — Birch, Stewart, Kolasch & Birch, LLP

(57) ABSTRACT

A robot is provided with driving wheels, a battery, a charging terminal, a charging terminal mounter in which the charging terminal is disposed, a first spring elastically supporting the charging terminal in an outward direction, a switch switched by the charging terminal mounter when the charging terminal mounter retreats, and a processor for stopping the driving wheels when the switch is switched by the charging terminal mounter.

20 Claims, 20 Drawing Sheets

(51) Int. Cl.
*B25J 19/02* (2006.01)
*B25J 11/00* (2006.01)

(56) References Cited

U.S. PATENT DOCUMENTS

| | | | |
|---|---|---|---|
| 11,153,503 | B1 | 10/2021 | Ebrahimi Afrouzi et al. |
| 11,199,853 | B1 | 12/2021 | Afrouzi et al. |
| 11,274,929 | B1 | 3/2022 | Afrouzi et al. |
| 11,348,269 | B1 | 5/2022 | Ebrahimi Afrouzi et al. |
| 11,446,811 | B2 * | 9/2022 | Lee ................ B25J 11/008 |
| 11,465,294 | B2 * | 10/2022 | Chae ................ G06N 20/00 |
| 11,517,487 | B2 * | 12/2022 | Kim ................ A61G 5/1094 |
| 11,531,910 | B2 * | 12/2022 | Choi ................ G06F 3/14 |
| 11,548,139 | B2 * | 1/2023 | Son ................ B25J 5/007 |
| 11,605,379 | B2 * | 3/2023 | Han ................ G10L 15/26 |
| 11,613,000 | B2 * | 3/2023 | Son ................ B25J 9/161 |
| | | | 280/288.4 |
| 11,613,030 | B2 * | 3/2023 | Kang ................ B25J 19/005 |
| | | | 318/568.12 |
| 11,663,516 | B2 * | 5/2023 | Kim ................ G06F 18/217 |
| | | | 706/12 |
| 2011/0148364 | A1 | 6/2011 | Ota |
| 2020/0020339 | A1 * | 1/2020 | Chae ................ G10L 15/1815 |
| 2021/0064792 | A1 * | 3/2021 | Kim ................ G06F 30/27 |
| 2021/0204785 | A1 * | 7/2021 | Lee ................ G06V 20/00 |
| 2021/0387346 | A1 | 12/2021 | Gillett |
| 2022/0066456 | A1 | 3/2022 | Ebrahimi Afrouzi et al. |

OTHER PUBLICATIONS

Podobnik et al., All-Terrain Wheelchair: Increasing Personal Mobility with a Powered Wheel-Track Hybrid Wheelchair, 2017, IEEE, p. 26-36 (Year: 2017).*

Fuchs et al., Rollin' Justin—Design considerations and realization of a mobile platform for a humanoid upper body, 2009, IEEE, p. 4131—(Year: 2009).*

Marco et al., Design considerations about a photovoltaic power system to supply a mobile robot, 2010, IEEE, p. 1829-1834 (Year: 2010).*

Al-Obaidi et al., Efficient Charging Pad for Unmanned Aerial Vehicle Based on Direct Contact, 2018, IEEE, p. 1-5 (Year: 2018).

Fukase et al., Learning self-localization with teaching system, 2007, IEEE, p. 1211-1216 (Year: 2007).

Silverman et al., Staying alive: a docking station for autonomous robot recharging, 2002, IEEE, p. 1050-1055 (Year: 2002).

Zhang et al., AUV terminal docking experiments based on vision guidance, 2016, IEEE, p. 1-5 (Year: 2016).

Zhang et al., Battery swapping and wireless charging for a home robot system with remote human assistance, 2013, IEEE, p. 747-755 (Year: 2013).

* cited by examiner

ROBOT AND ROBOT SYSTEM HAVING THE SAME

CROSS-REFERENCE TO RELATED APPLICATIONS

This application is a Continuation of application Ser. No. 16/845,968 filed on Apr. 10, 2020, which claims the priority benefit of Korean Patent Application No. 10-2019-0161331 filed in the Republic of Korea on Dec. 6, 2019, the entire contents of which are incorporated herein by reference.

FIELD OF THE DISCLOSURE

The present disclosure relates to a robot and a robot system including the same and, more particularly, to a robot capable of being charged by a charging station and a robot system including the same.

Robots have been developed for industrial use, for factory automation. Recently, since applications of robots have been further expanded, not only medical robots and aerospace robots but also robots available in daily life have been developed.

Such robots available in daily life provide specific services (e.g., shopping, serving, conversation, cleaning, etc.) in response to user's commands.

However, since existing robots available in daily life were designed to provide only specific services, the utilization of the robots is not high as compared to the cost invested to develop the robots.

Therefore, there is a need for a robot capable of providing various services.

A robot may be moved to a charging station and may be charged by a docking station (or a charging station). An example of a charging system including such a docking station includes an automatic charging system for a mobile robot and a charging method thereof disclosed in Korea Patent Registration Publication No. 10-0919765 (published Oct. 7, 2009).

The automatic charging system for the mobile terminal includes a mobile robot, in which a docking unit assembly is located, and a docking station which is in contact with the docking unit assembly.

The mobile robot includes a charging power connection terminal, an external supply power connection terminal, a docking side grounding unit, a docking side grounding assembly, a snap switch for checking contact of a docking unit, a key for fixing an insertion hole and a solenoid for operating the same.

The docking station includes an insertion hole assembly which is in contact with the docking unit assembly, a charging power connection terminal, an external supply power connection terminal, an insertion hole side grounding unit, a tension spring for correcting angle and phase errors at the time of docking, a compression spring, an x-axis ball bush bearing, a y-axis ball bush bearing, a charging module for charging a battery, a power supply module for supplying power to the charging module and a mobile robot, and an arm assembly capable of biaxial free translation through a self-aligning ball bearing, the x-axis ball bush bearing, the y-axis ball bush bearing and the compression spring.

SUMMARY

In the charging system according to the related art, when the mobile robot is docked at the docking station, excessive external force may be applied to the charging terminal until stopping of the driving wheels of the mobile robot is completed, thereby damaging the mobile robot.

Embodiments provide a robot capable of minimizing damage to a charging terminal during docking for charging.

Embodiments also provide a robot capable of minimizing damage to a robot or a charging station and maintaining the robot and the charging station with high reliability.

In an embodiment, a robot according to an embodiment may be provided with driving wheels and a battery. The robot includes a charging terminal, a charging terminal mounter in which the charging terminal is disposed, a first spring configured to elastically support the charging terminal in an outward direction, a switch switched by the charging terminal mounter when the charging terminal mounter retreats, and a processor configured to stop the driving wheels when the switch is switched by the charging terminal mounter.

A robot system according to an embodiment includes a robot and a charging station having a supply terminal connected with the charging terminal and disposed in a supply terminal mounter. The charging station may include a second spring configured to elastically support the supply terminal mounter in an outward direction.

The charging terminal may be brought into contact with the supply terminal while the robot travels. The first spring may be compressed before the second spring.

Maximum elastic force of the first spring may be less than minimum elastic force of the second spring.

The second spring may start to be compressed after the first spring is maximally compressed.

Each of the first spring and the second spring may be a coil spring, and a cross-sectional diameter of the first spring may be less than that of the second spring.

The first spring may elastically support the charging terminal such that the charging terminal protrudes to an outside of an outer circumferential surface of the robot.

The robot may further include a lidar (e.g., a lidar sensor), and a height of the charging terminal may be lower than that of the lidar.

The charging terminal mounter may include a main mounter having formed therein an opening surrounding an outer circumference of the charging terminal, and a push body extending from the main mounter to press a switch terminal of the switch.

The robot may further include a robot bracket having the switch installed thereon, and a spring guide configured to support the first spring.

The second spring may elastically support the supply terminal mounter such that the supply terminal mounter and the supply terminal protrude to an outside of an outer circumferential surface of the charging station.

The charging station may further include a supply terminal shaft configured to guide movement of the supply terminal mounter, and a station bracket connected to the supply terminal shaft to support the second spring.

A guide hole guided along an outer circumference of the supply terminal shaft may be formed in the supply terminal mounter.

DETAILED DESCRIPTION OF THE EMBODIMENTS

Figure 1:
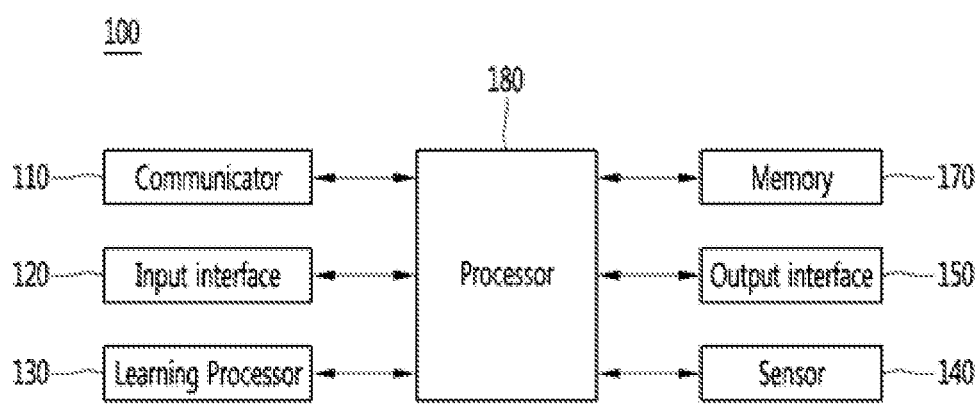
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee™, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar or any other type of sensor.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
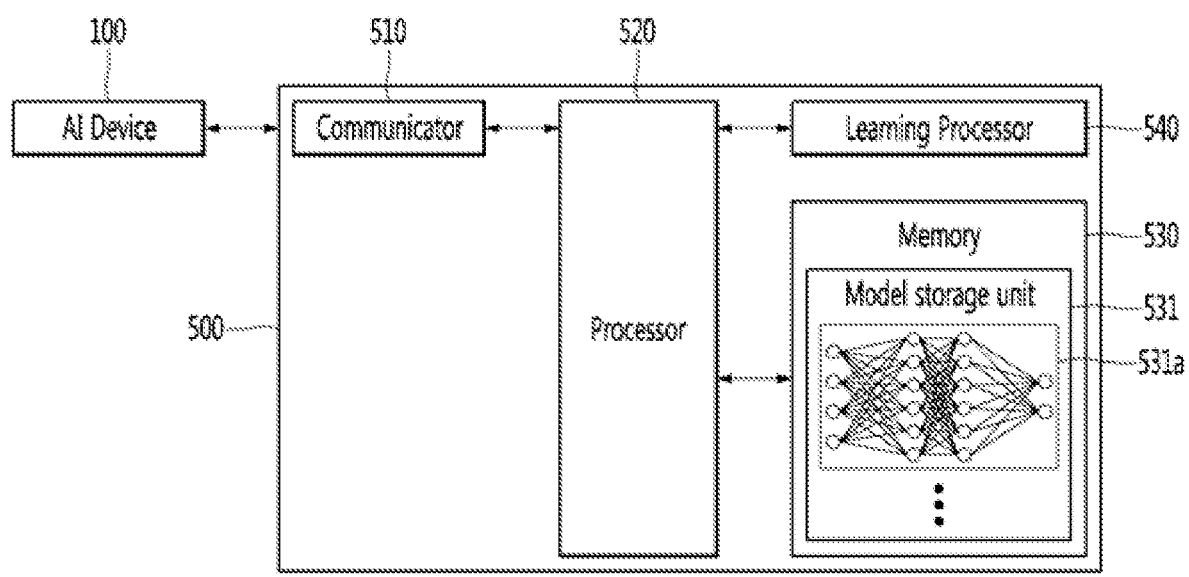
FIG. 2 is a view illustrating an AI server of a robot system according to an embodiment.

FIG. 2 illustrates an AI server 500 connected to a robot according to an embodiment of the present disclosure.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a processor 520, a memory 530, a model storage unit 531, an artificial neural network 531a, a learning processor 540, and the like.

The communicator 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
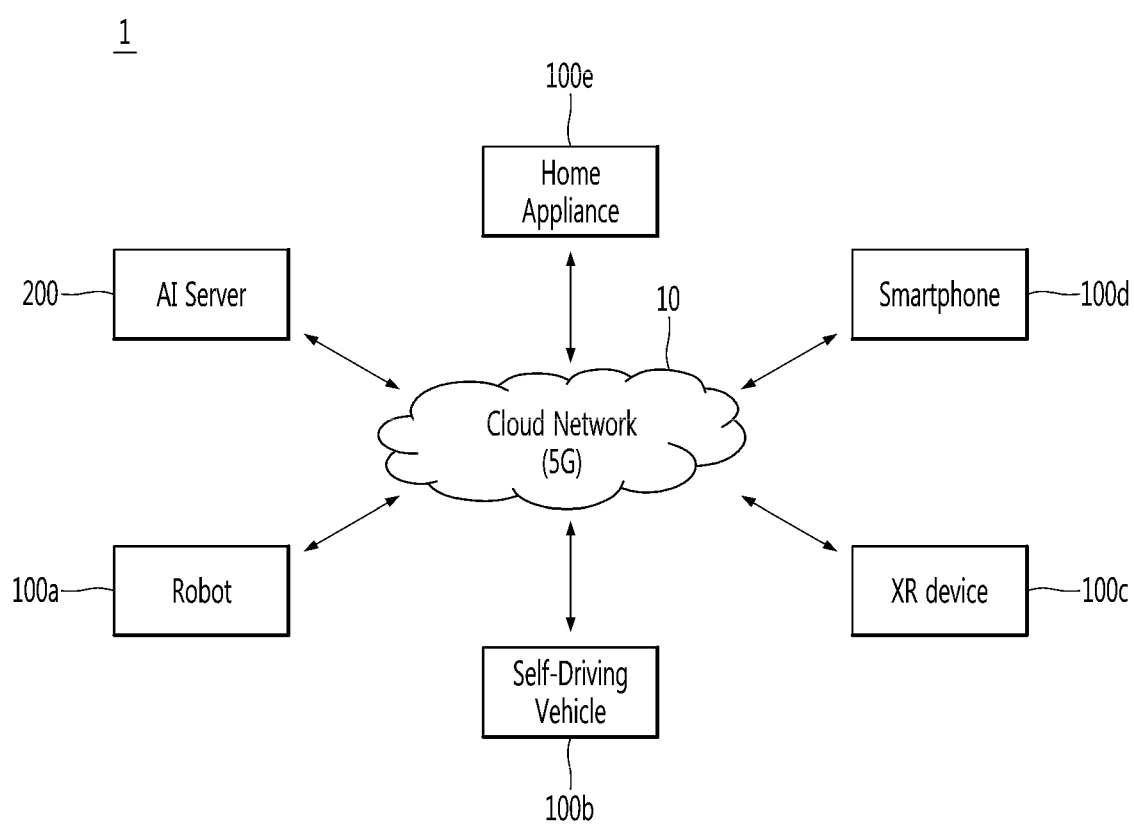
FIG. 3 is a view illustrating an AI system to which a robot system according to an embodiment is applied.

FIG. 3 illustrates an AI system 1 according to an embodiment of the present disclosure.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and the AI server 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (e.g., recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as chairs and desks. The object identification information may include a name, a type, a distance, and a position.

In addition, the robot 100a may perform the operation or travel by controlling the driving unit based on the control/ interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, a delivery robot capable of transporting various items such as medicine and medical supplies in a state of being contained in a drawer will be described.

Figure 4:
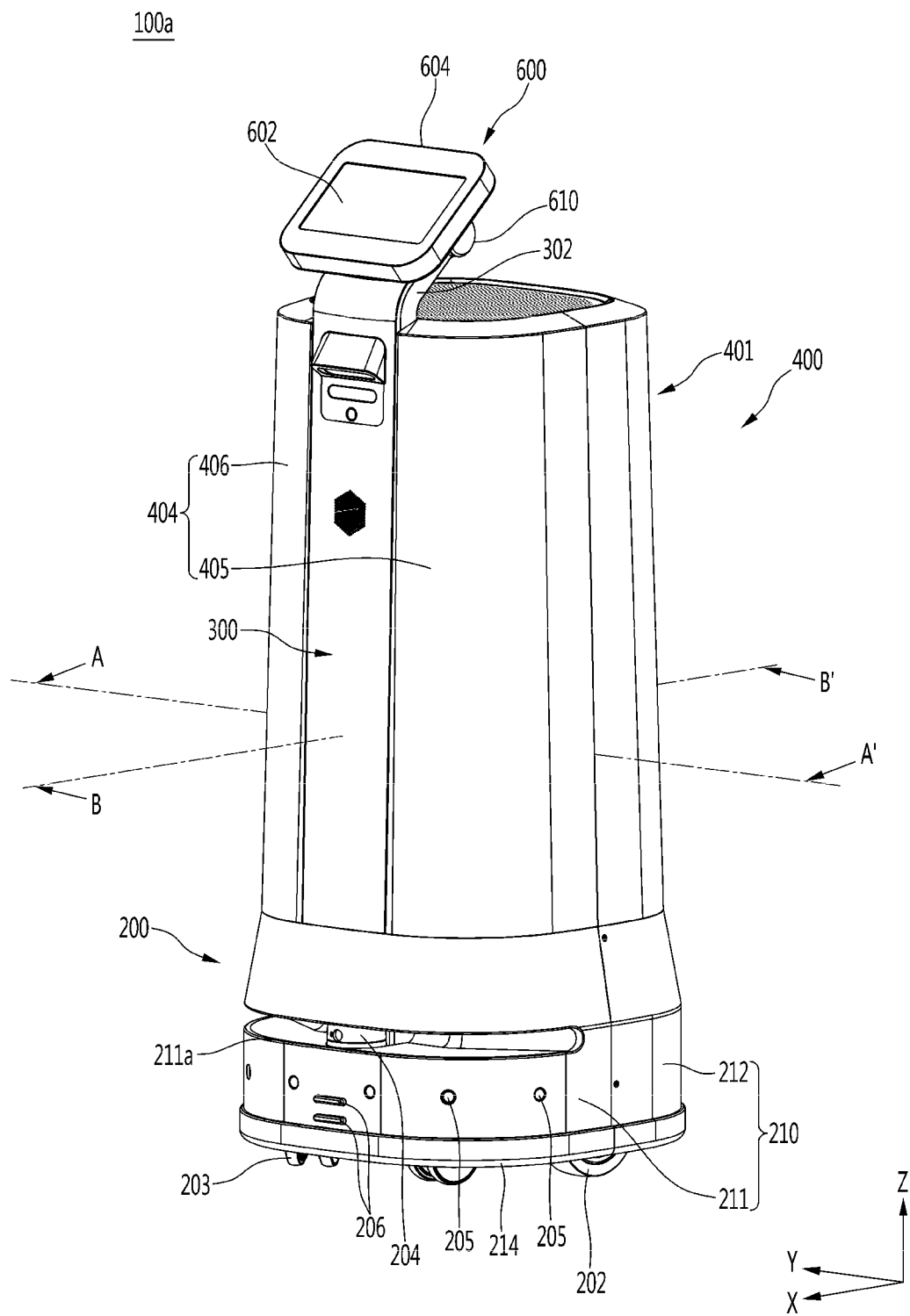
FIG. 4 is a perspective view of a robot according to an embodiment.
Figure 5:
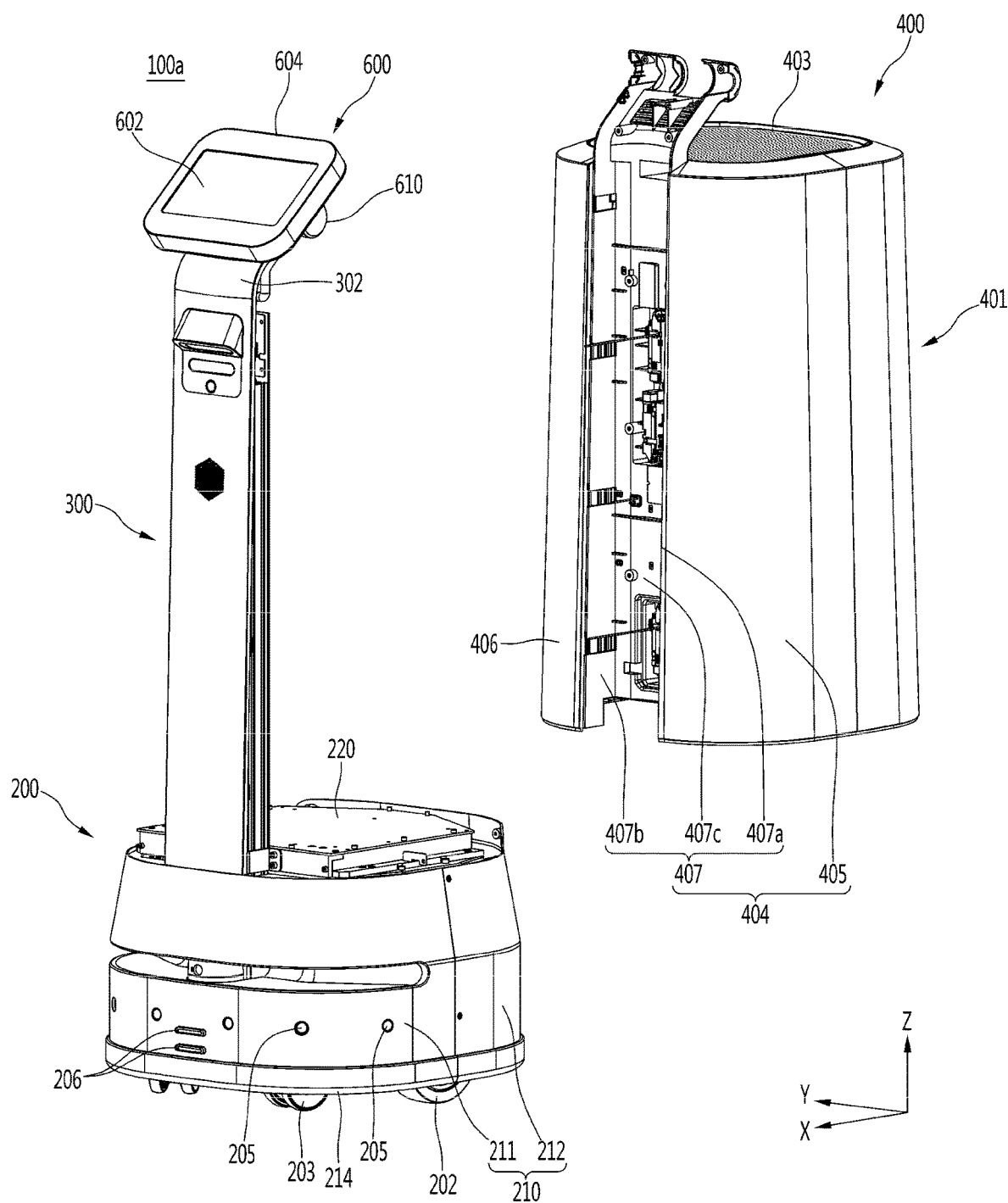
FIG. 5 is a perspective view when the service module shown in FIG. 4 is detached from a mobile robot.
Figure 6:
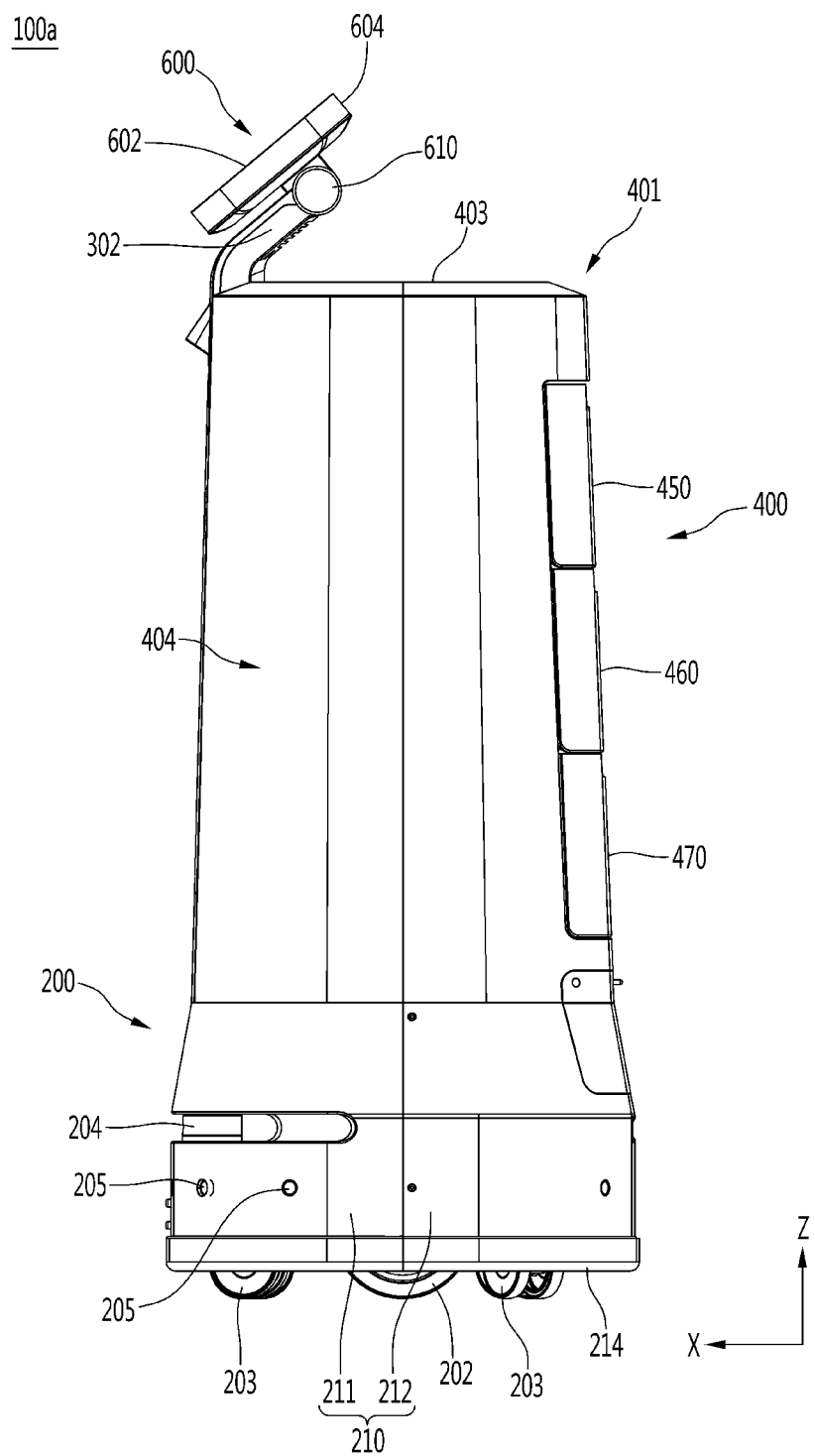
FIG. 6 is a side view of a robot according to an embodiment.
Figure 7:
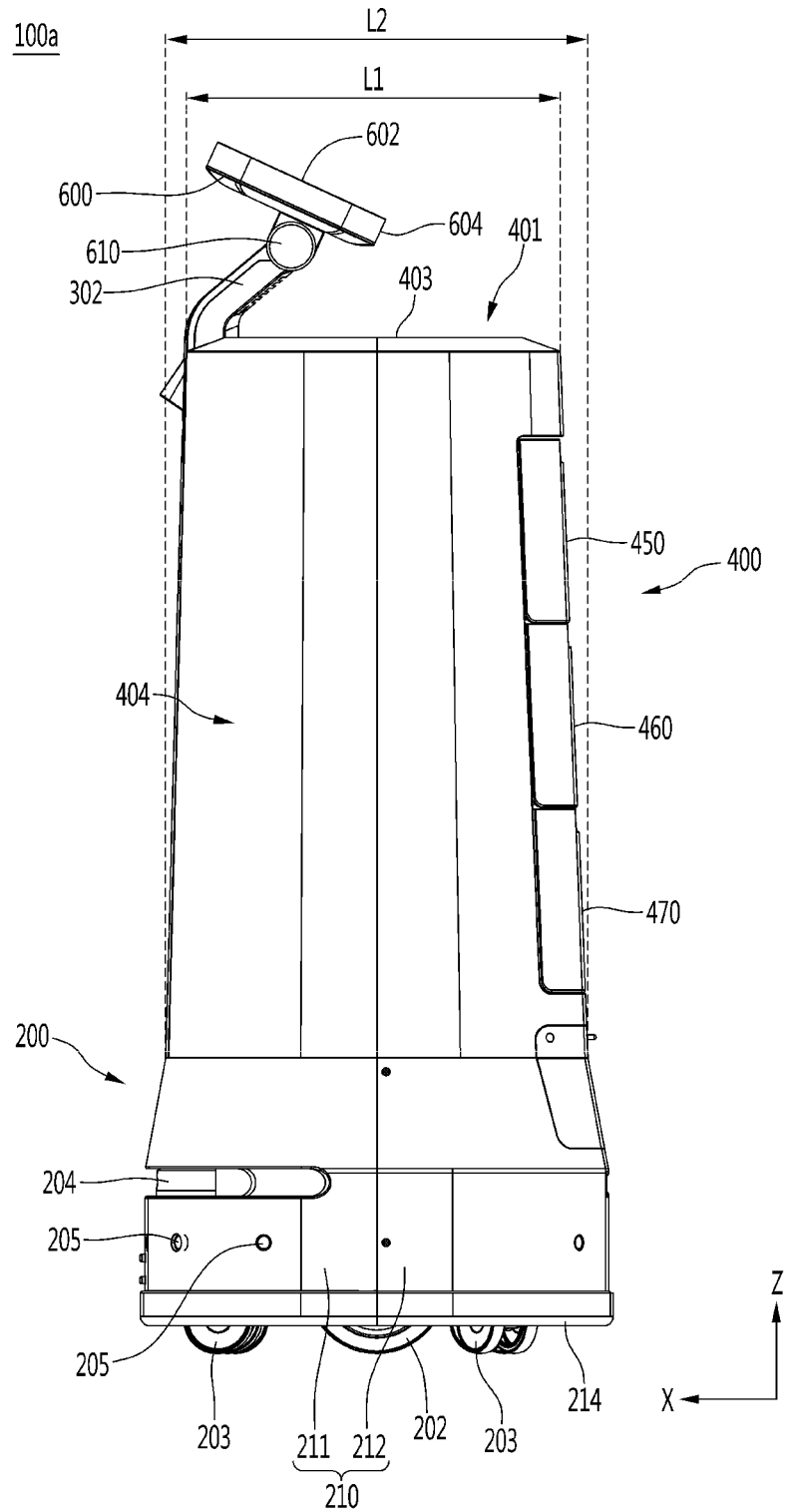
FIG. 7 is a side view when the display shown in FIG. 6 rotates rearward.
Figure 8:
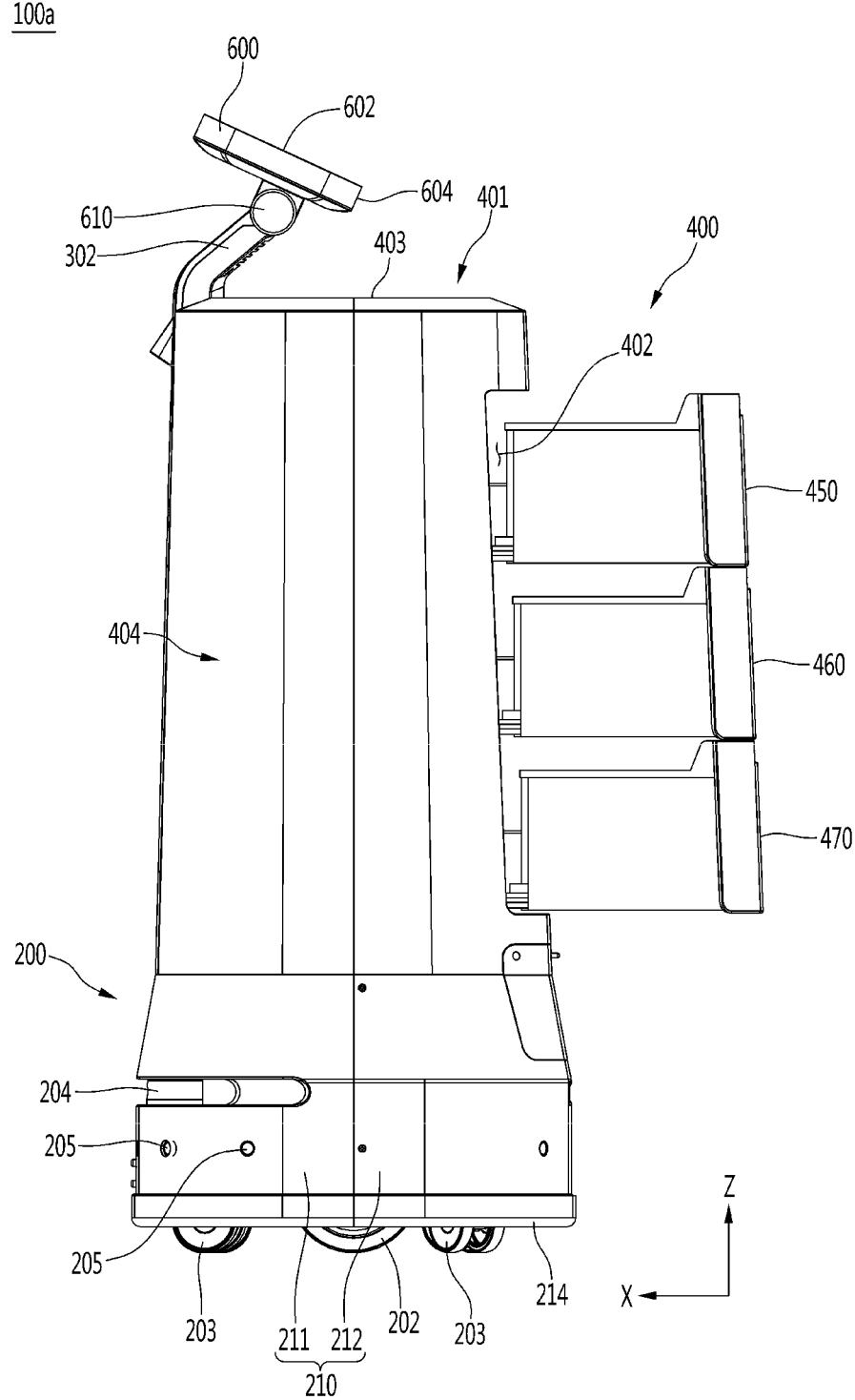
FIG. 8 is a side view when the drawer shown in FIG. 6 is drawn out rearward.

FIG. 4 is a perspective view of a robot according to an embodiment, FIG. 5 is a perspective view when the service module shown in FIG. 4 is detached from a mobile robot, FIG. 6 is a side view of a robot according to an embodiment, FIG. 7 is a side view when the display shown in FIG. 6 rotates rearward, and FIG. 8 is a side view when the drawer shown in FIG. 6 is drawn out rearward.

The robot 100a may include a mobile robot 200 and a service module 400 mounted on the mobile robot 200.

The mobile robot 200 may be the main body of the robot 100a. The mobile robot 200 may be an autonomous robot capable of autonomously traveling to a destination.

Driving wheels 202 may be disposed in the mobile robot 200. The driving wheels 202 may be disposed on the lower side of the mobile robot 200.

The mobile robot 200 may be provided with at least one caster 203. Each caster 203 may be disposed on the lower side of the mobile robot 200 to assist traveling of the robot 100a.

The mobile robot 200 may include a lower housing 210, a base plate 214 and a body frame 220 (see FIG. 5).

The lower housing 210 may form the appearance of the mobile robot 200. The lower housing 210 may form the appearance of the circumferential surface of the mobile robot 200. The lower housing 210 may surround the outer circumference of the body frame 220. The upper surface of the lower housing 210 may be opened.

The lower housing 210 may be a combination of a plurality of members. The lower housing 210 may include a front housing 211 and a rear housing 212, thereby facilitating fastening and detaching of the lower housing 210.

The front housing 211 may be convexly curved forward and the rear housing 212 may be convexly curved rearward. The rear end of the front housing 211 and the front end of the rear housing 212 may be in contact with each other. The outer surfaces of the front housing 211 and the rear housing 212 may be continuously connected.

The body frame 220 may be disposed on the base plate 214. The body frame 220 may be disposed inside the lower housing 210, and may be protected by the lower housing 210 and the base plate 214.

The mobile robot 200 may be provided with a lidar (i.e., lidar sensor) 204. An opening 211a, in which the lidar 204 is disposed, may be formed in the lower housing 210. The opening 211a may be opened forward and may be formed to extend in a left-and-right direction Y. The lidar 204 may detect an obstacle or a person located in front of the robot 100a through the opening 211a.

The mobile robot 200 may be provided with a plurality of ultrasonic sensors 205. The plurality of ultrasonic sensors 205 may be spaced apart from each other in the circumferential direction of the mobile robot 200. A plurality of openings, in which the ultrasonic sensors 205 are disposed, may be formed in the outer circumference of the lower housing 210. Each ultrasonic sensor 205 may detect an object located near the robot 100a.

The ultrasonic sensors 205 may be installed at positions lower than that of the lidar 204. More specifically, based on the lower end of the mobile robot 200, the height of the ultrasonic sensors 205 may be less than that of the lidar 204.

The mobile robot 200 may be provided with a charging terminal 206 for charging the robot 100a. A through-hole, through which the charging terminal 206 passes, may be formed in the lower housing 210 and, more specifically, the front housing 211. The charging terminal 206 may protrude forward from the lower housing 210 through the through-hole.

The height of the charging terminal 206 may be less than that of the lidar 204. The charging terminal 206 may be installed at a position less than that of the ultrasonic sensors 205. More specifically, based on the lower end of the mobile robot 200, the height of the charging terminal 206 may be less than the height of the lidar 204 and the height of the ultrasonic sensors 205.

The base plate 214 may form the appearance of the bottom of the mobile robot 200.

The mobile robot 200 may be provided with a frame 300. The frame 300 may extend to protrude upward (i.e., vertically along a vertical axis, in an upper-and-lower direction z or in a vertical direction z) from the front portion of the mobile robot 200. The frame 300 may be a front frame disposed on a front portion of the mobile robot 200. A display 600 may be disposed on an upper portion of the frame 300. The display 600 may configure the head of the robot 100*a*, and the frame 300 may configure the neck body of the robot 100*a*.

The frame 300 may be a combination of a plurality of members. The frame 300 may be manufactured separately with the mobile robot 200 and then may be coupled to the upper side of the front portion of the mobile robot 200. A portion of the frame 300 may be integrally formed in the mobile robot 200, and may be formed to protrude upward from the front portion of the mobile robot 200.

The frame 300 may be approximately vertically formed. The frame 300 may be formed to gradually become thin upward. The rear surface of the frame 300 may be vertically disposed, and the front surface of the frame 300 may become closer to the rear surface of the frame 300 upward. The front surface of the frame 300 may configure an inclined surface to be formed to be inclined at a predetermined angle.

The upper portion of the frame 300 may be bent rearward and upward. A display connector 302 rotatably connected with the display 600 may be formed on the upper portion of the frame 300.

The frame 300 may include a gradient portion having an inclined surface formed on a front surface thereof and gradually become thin upward and the display connector 302 extending to the upper side of the service module 600 above the gradient portion.

The display connector 302 may be located above the service module 400 in an upper-and-lower direction Z. The display connector 302 may overlap an upper surface 403 of the service module 400 in the upper-and-lower direction (i.e., vertical direction) Z. The display connector 302 may be spaced apart from the upper surface 403 of the service module 400 in the upper-and-lower direction Z.

In this case, a user may place an item on the upper surface of the service 600, thereby improving convenience of the service module 600.

The service module 400 may cover (or overlap) the open upper surface of the lower housing 210 from the upper side. The service module 400 may cover (or overlap) the body frame 220 from the upper side. However, the present disclosure is not limited thereto, and the upper surface of the lower housing 210 may support the service module 400.

The service module 400 may be a combination of a plurality of members. The service module 400 may include a housing 401 and at least one drawer inserted into the housing 401 or drawn out of the housing 401.

The housing 401 may form the appearance of the service module 400.

For example, the housing 401 may be manufactured separately from the mobile robot 200 and then mounted to be seated on the mobile robot 200.

In another example of the housing 401, the whole or a portion of the housing 401 may integrally protrude upward from the mobile robot 200.

An opening 402 (see FIG. 8), through which the drawer moves into or out of the housing, may be formed in the housing 401. The opening 402 may be formed in the rear surface of the housing 401. The opening 402 may be formed in the rear portion of the housing 401 to be opened in a front-and-rear direction X.

The drawer may be moved out of the housing 401 to be drawn out of the housing 401, and may be moved from the outside of the housing 401 to the inside of the housing 401 to be accommodated in the housing 401.

The drawer may be moved rearward in the housing 401 to be drawn out of the housing 401, and may be moved from the rear side of the housing 401 to the inside of the housing 401 to be accommodated in the housing 401.

The housing 401 may include an outer housing 404 forming the appearance of the service module 400.

The outer circumferential surface of the outer housing 404 may include a curved surface.

The upper surface 403 of the outer housing 404 may have a planar shape, and the upper surface 403 of the outer housing 404 may be spaced apart from the display 600 located thereabove in the upper-and-lower direction Z.

The outer housing 404 may include a pair of side bodies 405 and 406. The front ends of the pair of side bodies 405 and 406 may be spaced apart from each other in the left-and-right direction (i.e., horizontal direction) Y. The opening 402 which is open in the front-and-rear direction X may be formed between the rear ends of the pair of side bodies 405 and 406.

The housing 401 may include a front body 407 surrounding the rear surface and the side surface of the frame 300. The front body 407 may be a portion of the outer housing 404.

The front body 407 may be interposed between the pair of side bodies 405 and 406 configuring the outer housing 404.

The front body 407 may include a left plate 407*a*, a right plate 407*b* and a rear plate 407*c*.

The left plate 407*a* and the right plate 407*b* of the front body 407 may be spaced apart from each other in the left-and-right direction Y.

The rear plate 407*c* of the front body 407 may be formed to connect the rear portions of the left plate 407*a* with the right plate 407*b*.

The left plate 407*a* of the front body 407 may cover the left surface of the frame 300.

The right plate 407*b* of the front body 407 may cover the right surface of the frame 300.

The rear plate 407*c* of the front body 407 may cover the rear surface of the frame 300.

A drawer guide capable of guiding movement of the drawer may be disposed in the housing 401. A plurality of drawer guides may be provided in the service module 400, and the plurality of drawer guides 420, 430 and 440 may be disposed in the housing 401 with height differences.

The plurality of drawer guides 420, 430 and 440 may be manufactured with the same size and shape and then mounted in the housing 401, thereby minimizing the manufacturing cost of the robot 100*a*.

A plurality of drawers may be provided in the housing 401, and the plurality of drawers 450, 460 and 470 may be manufactured with the same size and shape and then mounted in the drawer guides, thereby minimizing the manufacturing cost of the robot 100*a*.

When the plurality of drawer guides 420, 430 and 440 is disposed in the housing 401 with the height differences, the plurality of drawers 450, 460 and 470 may be disposed in the housing 401 with height differences.

Hereinafter, for convenience of description, the uppermost drawer 450 located at the uppermost side among the plurality of drawer 450, 460 and 470 may be referred to as a first drawer 450, the drawer 460 closest to the first drawer 450 under the first drawer 450 may be referred to as a second drawer 460, and the lowermost drawer 470 located at the lowermost side among the drawers 450, 460 and 470 may be referred to as a third drawer 470.

Meanwhile, the robot 100a is not limited to including three drawers 450, 460 and 470, and the robot may include two drawers or four or more drawers. Hereinafter, for convenience of description, assume that three drawers 450, 460 and 470 are disposed.

Hereinafter, the common configuration of the first drawer 450, the second drawer 460 and the third drawer 470 may be referred to as the drawers 450, 460 and 470.

The plurality of drawer guides 420, 430 and 440 may include a first drawer guide 420 for guiding the first drawer 450 and a second drawer guide 430 located under the first drawer guide 420 to guide the second drawer 460.

The plurality of drawer guides 420, 430 and 440 may further include a third drawer guide 440 located under the second drawer guide 430 to guide the third drawer 470.

Hereinafter, the common configuration of the first drawer guide 420, the second drawer guide 430 and the third drawer guide 440 may be referred to as the drawer guides 420, 430 and 440.

The plurality of drawer guides 420, 430 and 440 may be disposed in the housing 401 to be spaced apart from each other in the upper-and-lower direction Z.

Meanwhile, the robot 100a may further include the display 600. The robot 100a may a display rotor 610 for rotating the display 600.

The display 600 may be rotatably installed in the mobile robot 200, the frame 300 or the service module 400. The display 600 may configure a head rotatably disposed at the upper portion of the frame 300. The display 600 may be a front head disposed above the front portion of the robot 100a in the front-and-rear direction X.

A screen 602 such as a touchscreen may be provided on one surface of the display 600, and a variety of information may be displayed through the screen 602.

The width of the display 600 in the left-and-right direction Y may be less than that of the service module 400 in the left-and-right direction Y.

The display 600 may be provided with a scanner 604. The scanner 604 may be configured to scan a barcode and/or a QR code. The user may tag the scanner 604 with a barcode and/or a QR code to confirm the authenticated user and use the robot 100a.

When the display 600 is erected to face a front upper side as shown in FIG. 6, the scanner 604 may face the rear upper side at the upper side of the display 600. When the display 600 is rotated to face a rear upper side as shown in FIG. 7, the scanner 604 may face a rear lower side.

A display rotor 610 may be installed in the frame 300. The display rotor 610 may rotate the display 600 in a plurality of modes. The display rotor 610 may rotate the display 600 such that the display 600 is tilted about a horizontal shaft positioned horizontally.

The display rotor 610 may include a motor installed in the frame 300, and at least one power transmission member for connecting the motor with the horizontal shaft of the display 610. When the motor is driven, the display 600 may be rotated about the horizontal shaft.

The display 600 may be defined as having a plurality of modes according to the angle thereof. The plurality of modes may include a first mode in which the screen 602 of the display 600 faces a front upper side and a second mode in which the screen 602 of the display 600 faces a rear upper side.

The display 600 may display different information in the first mode and the second mode.

The first mode may be executed when the mobile robot 200 travels. The display 600 may display an image, an emoticon or a picture (or the like) representing a smiley face on the screen 602 in the first mode. A pedestrian around the robot 100a may view an image or a picture displayed through the screen 602 of the display 600 and recognize that the robot is currently traveling.

The second mode may be executed when the mobile robot 200 is stopped without traveling. The display 600 may display at least one menu item selectable by the user in the second mode, and the user may touch a menu item displayed through the screen of the display 600 to input various commands.

While the robot 100a travels to a destination, the screen 602 of the display 600 may face the front upper side as shown in FIG. 6, and the display 600 may display an image, an emoticon, a picture, etc. through the screen 602.

When the robot 100a arrives at the destination, the display rotor 610 may rotate the display 600 as shown in FIG. 7, and the screen 602 of the display 600 may face the rear upper side. In this case, the display 600 may display at least one menu item capable of being input by the user through the screen 602.

Meanwhile, the service module 400 may be formed such that the user easily approaches the display 600 while minimizing overturning of the robot 100a.

The horizontal length L1 of the upper end of the service module 400 may be less than the horizontal length L2 of the lower end of the service module 400. The upper end of the housing 401 may be the upper end of the service module 400, and the lower end of the housing 401 may be the lower end of the service module 400. In this case, the horizontal length L1 of the upper end of the housing 401 may be less than the horizontal length L2 of the lower end of the housing 401.

In addition, the service module 400 may gradually become thin (i.e., have a reduced circumference or width) upward when each of the plurality of drawers 450, 460 and 470 is maximally inserted into the housing 401.

When the lower portion of the service module 400 is thick and the upper portion of the service module 400 is thin, the center of gravity of the service module 400 may be lowered and the periphery of the upper portion of the service module 400 may be used as a space for enabling approaching of the user.

When the center of gravity of the robot 100a is low, the possibility of overturning the robot 100a may be minimized.

Meanwhile, the user may approach the display 600 as close as possible in a state of being located in the vicinity of the service module 400 (more particularly, next to or behind the service module 400), and recognize information on the display 600, and input various commands through the display 600. In addition, the user can easily scan a barcode and/or a QR code on the scanner 604.

Figure 9:
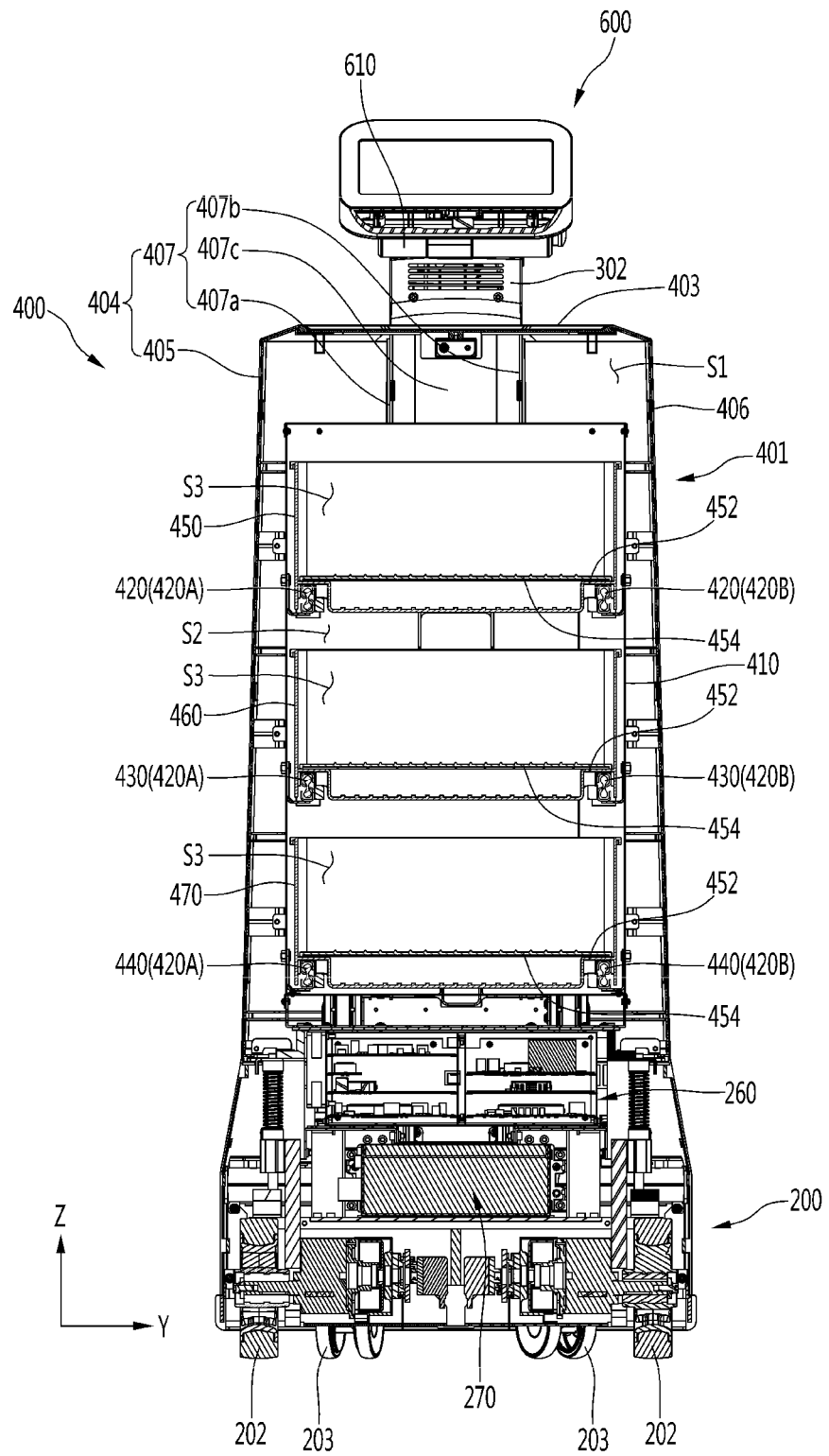
FIG. 9 is a cross-sectional view taken along line A-A' of FIG. 4.
Figure 10:
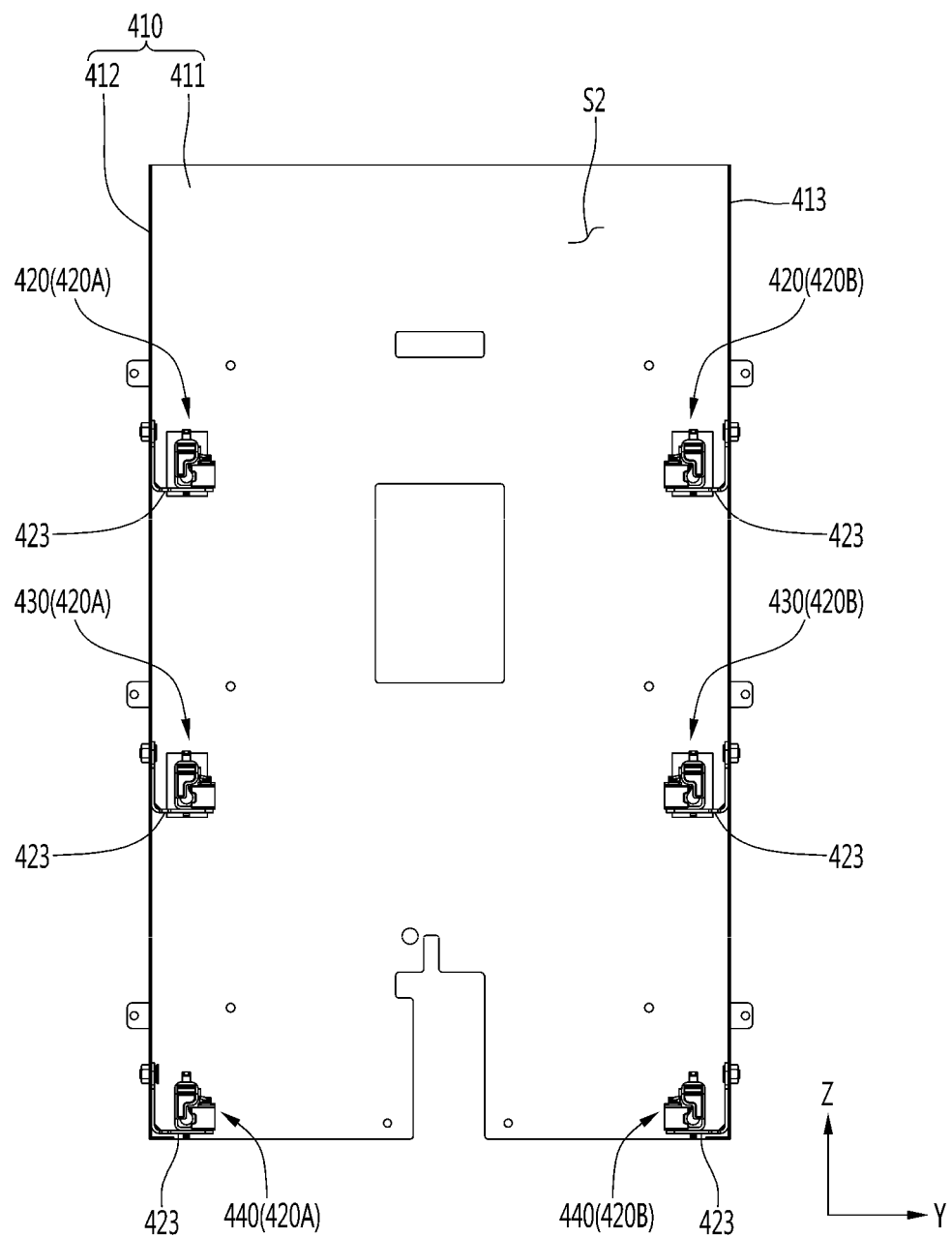
FIG. 10 is a rear view of the inner housing shown in FIG. 9.
Figure 11:
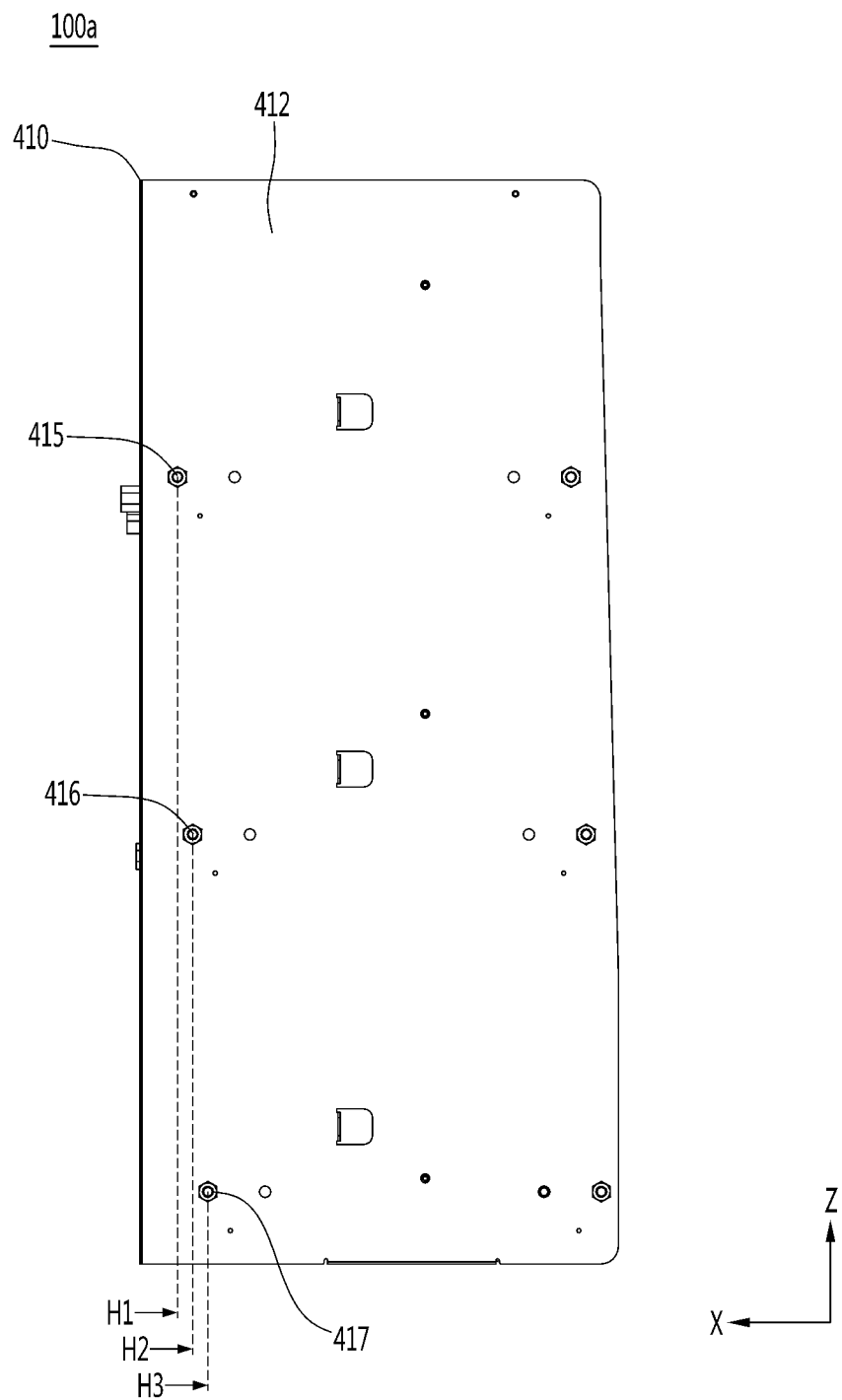
FIG. 11 is a side view of the inner housing shown in FIG. 9.

FIG. 9 is a cross-sectional view taken along line A-A' of FIG. 4, FIG. 10 is a rear view of the inner housing shown in FIG. 9, and FIG. 11 is a side view of the inner housing shown in FIG. 9.

Figure 12:
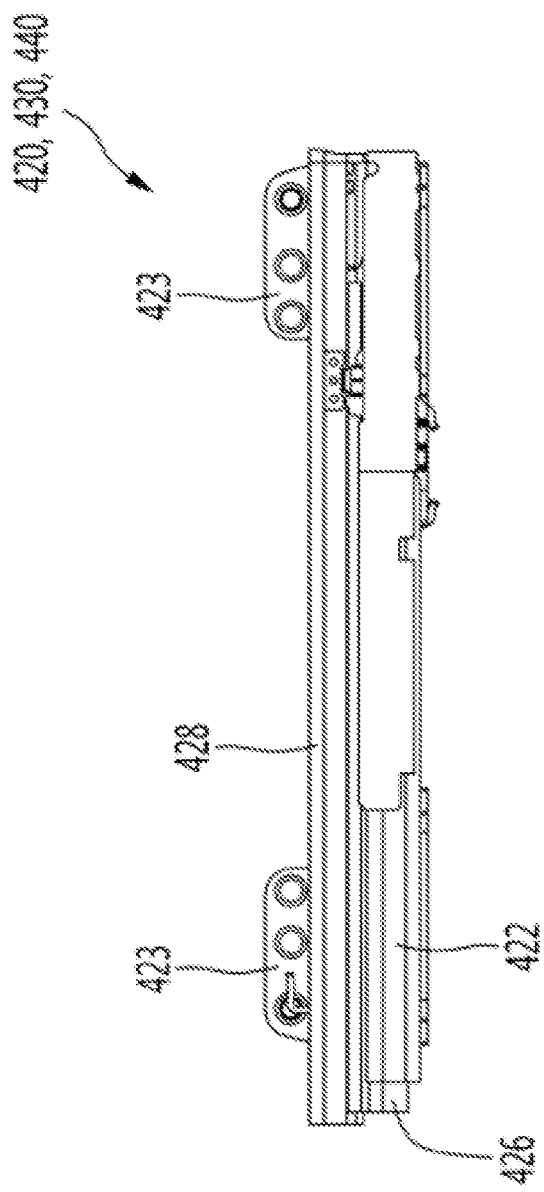
FIG. 12 is a side view of a drawer guide when a drawer according to the present disclosure is located at a maximum drawn-in position.
Figure 13:
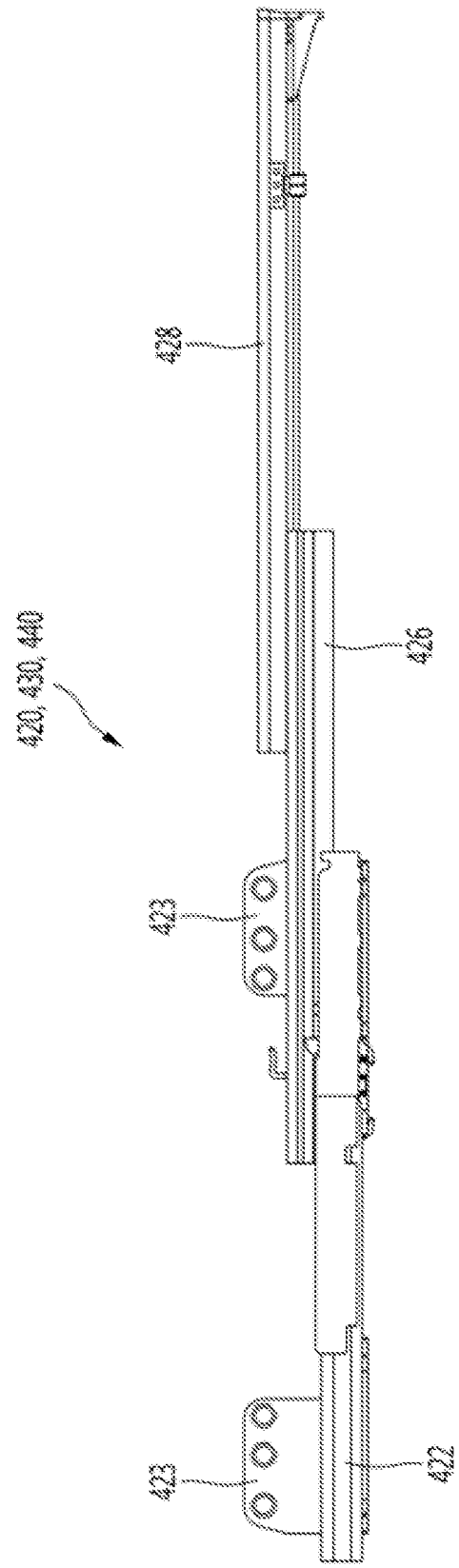
FIG. 13 is a side view of a drawer guide when a drawer according to the present disclosure is located at a maximum drawn-out position.

FIG. 12 is a side view of a drawer guide when a drawer according to the present disclosure is located at a maximum drawn-in position, and FIG. 13 is a side view of a drawer guide when a drawer according to the present disclosure is located at a maximum drawn-out position.

The housing 401 may be a combination of a plurality of members. The housing 401 may include the outer housing 404 and an inner housing 410 disposed inside the outer housing 404.

The outer housing 404 may have an open lower surface. A space S1 (see FIG. 9), in which the inner housing 410 is accommodated, may be formed in the outer housing 404.

The outer housing 404 may include a pair of side bodies 405 and 406, and the pair of side bodies 405 and 406 may cover the outer side surface of the inner housing 410. The front body 407 of the outer housing 404 may be disposed in front of the inner housing 410.

The inner housing 410 may be smaller than the outer housing 404, and may be accommodated in the space S1 formed in the outer housing 404.

The inner housing 410 may have an open rear surface. An inner space S2, in which the plurality of drawers 450, 460 and 470 is accommodated, may be formed in the inner housing 410. As shown in FIG. 10, the inner housing 410 may include a front plate 411, a left plate 412 and a right plate 413.

Each of the drawer guides 420, 430 and 440 may include a fixed bracket 422 and a moving bracket moving along the fixed bracket 422, as shown in FIGS. 12 and 13.

The fixed bracket 422 may be installed in the housing 401. The fixed bracket 422 may be fastened to a guide bracket 423 installed in the housing 401. The guide bracket 423 may be fixed to the housing 401 by fastening members such as a bolt and a nut or a screw. The fixed bracket 422 may be fastened to the housing 401 by the guide bracket 423.

Each of the drawer guides 420, 430 and 440 may include a pair of moving brackets 426 and 428, and the pair of brackets 426 and 428 may include the first moving bracket 426 guided along the fixed bracket 422 and the second moving bracket 428 guided along the first moving bracket 426.

The moving brackets 426 and 428 may move along the fixed bracket 422 and a portion thereof may be drawn out of the housing 401 through the opening 402 (see FIG. 8).

Each of the plurality of drawer guides 420, 430 and 440 may include a pair of guides 420A and 420B spaced apart from each other in the left-and-right direction Y. Each of the pair of guides 420A and 420B may include the fixed bracket 422 and the pair of moving brackets 426 and 428.

A mounting hole, in which the fixed bracket 422 of each of the plurality of drawer guides 420, 430 and 440 is mounted, may be formed in the inner housing 410.

In the inner housing 410, as shown in FIG. 11, a first mounting hole 415, in which the fixed bracket 422 of the first drawer guide 420 is mounted, may be formed and a second mounting hole 416, in which the fixed bracket 422 of the second drawer guide 430 is mounted, may be formed. In addition, a third mounting hole 417, in which the fixed bracket 422 of the third drawer guide 440 is mounted, may be formed in the inner housing 410, as shown in FIG. 11.

The service module 400 may be formed such that the horizontal width thereof is gradually reduced upward, and, when the robot 100a includes the drawer guides 420, 430 and 440 having the same size and shape, the plurality of drawer guides 420, 430 and 440 may be mounted in the inner housing 410 with a step difference.

In this case, the distance H1 between the first mounting hole 415 and the frame 300 may be less than the distance H2 between the second mounting hole 416 and the frame 300. In addition, the distance H2 between the second mounting hole 416 and the frame 300 may be less than the distance H3 between the third mounting hole 417 and the frame 300.

The plurality of drawer guides 420, 430 and 440 may be mounted to become closer to the frame 300 upward.

Each of the drawers 450, 460 and 470 may have an open upper surface, and a drawer space S3, in which items such as medicine and medical supplies may be accommodated, may be formed in each of the drawers 450, 460 and 470.

A pocket 452 may be formed on the bottom of each of the drawers 450, 460 and 470. The drawer guide may be accommodated in the pocket 452. The pocket 452 may surround the upper surface, the left surface and the right surface of the drawer guide. The pocket 452 may be provided to protrude toward the drawer space S3.

The pocket 452 may include a left plate, a right plate and an upper plate. The pocket 452 may surround the upper surface, the left surface and the right surface of the drawer guide. The pocket 452 may be formed at each of the left and right sides of the lower plate of the drawer 450, 460, 470. The left plate and the right plate of the pocket 452 may be located next to the drawer guides 420, 430 and 440 to cover the drawer guides 420, 430 and 440 such that the drawer guides 420, 430 and 440 are invisible at the side of the robot 100a.

When the drawers 450, 460 and 470 are drawn out as shown in FIG. 8, the drawers 450, 460 and 470 may cover the drawer guides 420, 430 and 440 as much as possible, and the overall appearance of the robot 100a may be enhanced.

The service module 400 may further include a shelf 454 placed on the upper surface of the upper plate of the pocket 452.

In the drawer space S3 of the drawers 450, 460 and 470, the pair of pockets 452 may protrude upward with a step difference, the shelf 454 may cover the pair of pockets 452 above the pair of pockets 452, and the items such as medicine and medical supplies may be guided not to be caught between the pair of pockets 452.

The shelf 454 may be drawn over the drawers 450, 460 and 470 when there is a lot of items to be stored in the drawers 450, 460 and 470. In this case, the volume of items which may be stored in the drawers 450, 460 and 470 may be maximized.

Figure 14:
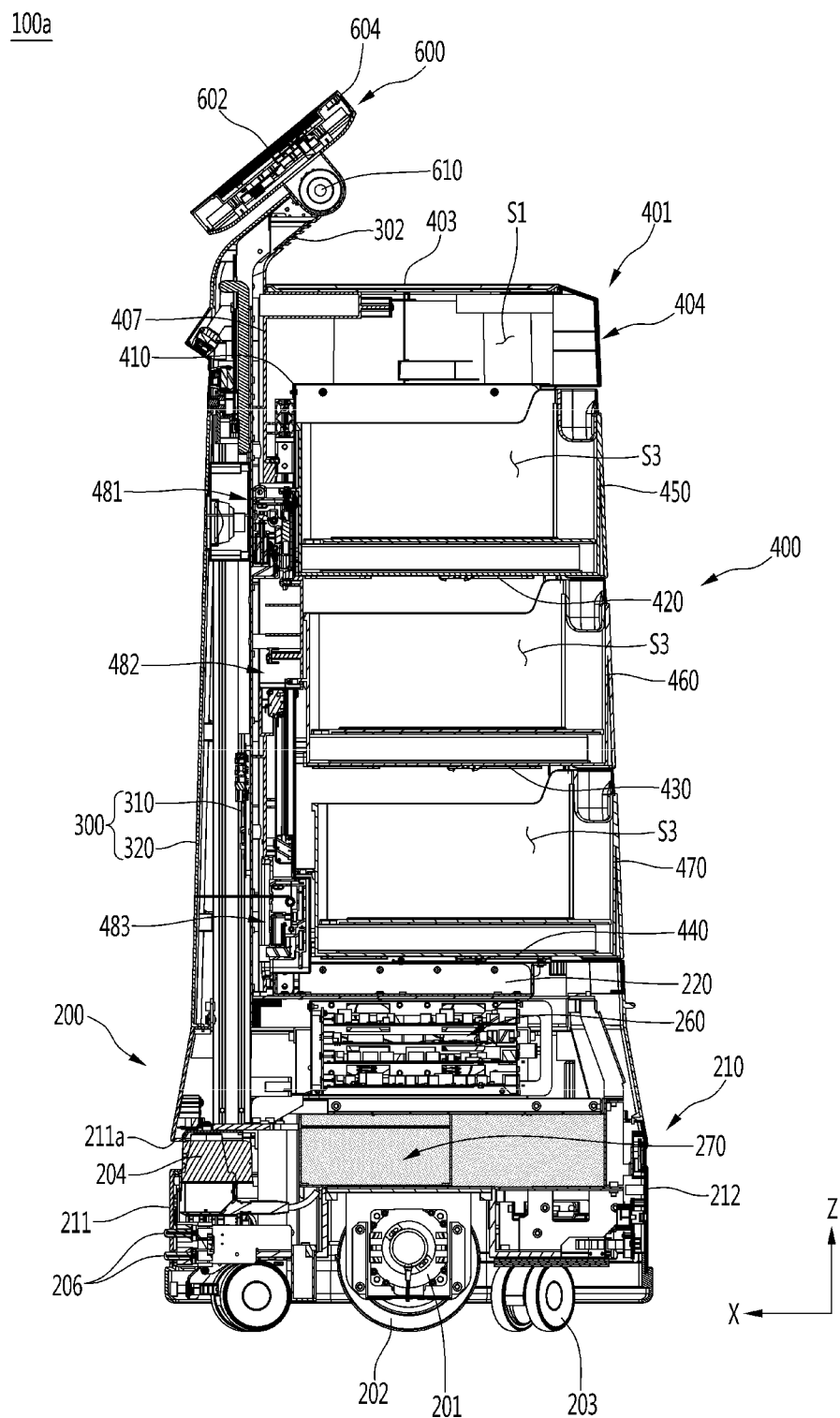
FIG. 14 is a cross-sectional view taken along line B-B' of FIG. 4.

FIG. 14 is a cross-sectional view taken along line B-B' of FIG. 4.

The mobile robot 200 may be provided with a driving motor 201 for rotating the driving wheels 202. The driving motor 201 may be provided in the body frame 220. The driving motor 201 may be located at a height lower than that of the battery 270. The driving motor 201 may be located inside the lower housing 210.

The robot 100a may dock the charging terminal 206 in a charging station, and the charging station may charge the battery 270 installed in the robot 100a through the charging terminal 206.

In the mobile robot 200, a control rack 260 and the battery 270 may be installed. More specifically, the control rack 260 and the battery 270 may be located inside the lower housing 210 and may be mounted in the body frame 220.

The control rack 260 may include a plurality of boards for operation of the robot 100a. For example, the control rack 260 may include a main control board for controlling overall operation of the robot 100a and a power board electrically connected to the battery 270.

The battery 270 may supply power necessary for operation of the robot 100a. The battery 270 may be electrically connected to the charging terminal 206, and the battery 270 may be charged through the charging terminal 206.

The battery 270 may be located below the control rack 260. That is, since the battery 270 having a relatively larger weight is located at the lower side of the mobile robot 200, the center of weight of the mobile robot 200 may be low, such that the robot 100a stably travels.

The height of the upper end of the frame 300 may be greater than that of the upper surface 403 of the service module 400.

The frame 300 may be a combination of a plurality of members. The frame 300 may include a front neck 310 and a front cover 320 covering the front surface of the front neck 310.

As shown in FIG. 14, when the service module 400 is coupled to the mobile robot 200, the front neck 310 may be disposed at the front side of the housing 401 and, more particularly, the outer housing 404, and may be disposed between the front body 407 of the outer housing 404 and the front cover 320.

The robot 100a may include lockers disposed in the housing 401 to lock or unlock the drawers 450, 460 and 470.

The lockers may be mounted in the housing 401 and, more particularly, the outer housing 404. The lockers may be mounted on the front body 407 and, more particularly, on the rear plate 407c of the front body 407.

The lockers may one-to-one-correspond to the drawers 450, 460 and 470, and the plurality of lockers 481, 482 and 483 may be disposed in the robot 100a.

The plurality of lockers 481, 482 and 483 may include a first locker 481 for locking or unlocking the first drawer 450 and a second locker 482 for locking or unlocking the second drawer 460.

The plurality of lockers 481, 482 and 483 may further include a third locker 483 for locking or unlocking the third drawer 470.

Hereinafter, the common configuration of the first locker 481, the second locker 482 and the third locker 483 is referred to as the lockers 481, 482 and 483.

The plurality of lockers 481, 482 and 483 may be installed in the housing 401 and, more particularly, the outer housing 404, and, more particularly, may be installed on the front body 407.

The plurality of lockers 481, 482 and 483 may be disposed in the front body 407 to overlap each other in the upper-and-lower direction Z.

Among the plurality of lockers 481, 482 and 483, the first locker 481 may be disposed to be located at the uppermost side, the second locker 482 may be disposed below the first locker 481, and the third locker 483 may be disposed below the second locker 482.

Figure 15:
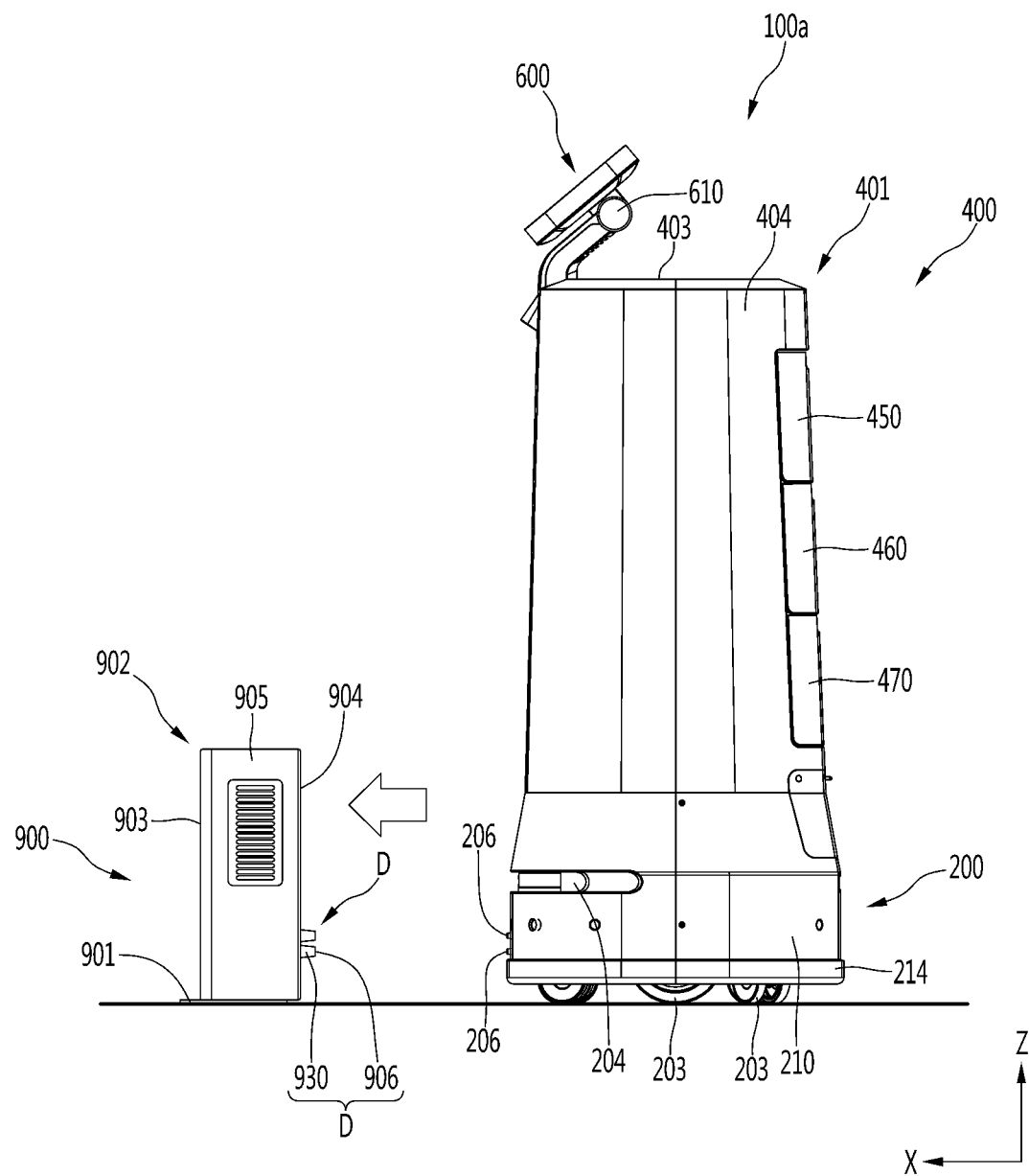
FIG. 15 is a side view when a robot according to an embodiment of the present disclosure travels toward a charging station.
Figure 16:
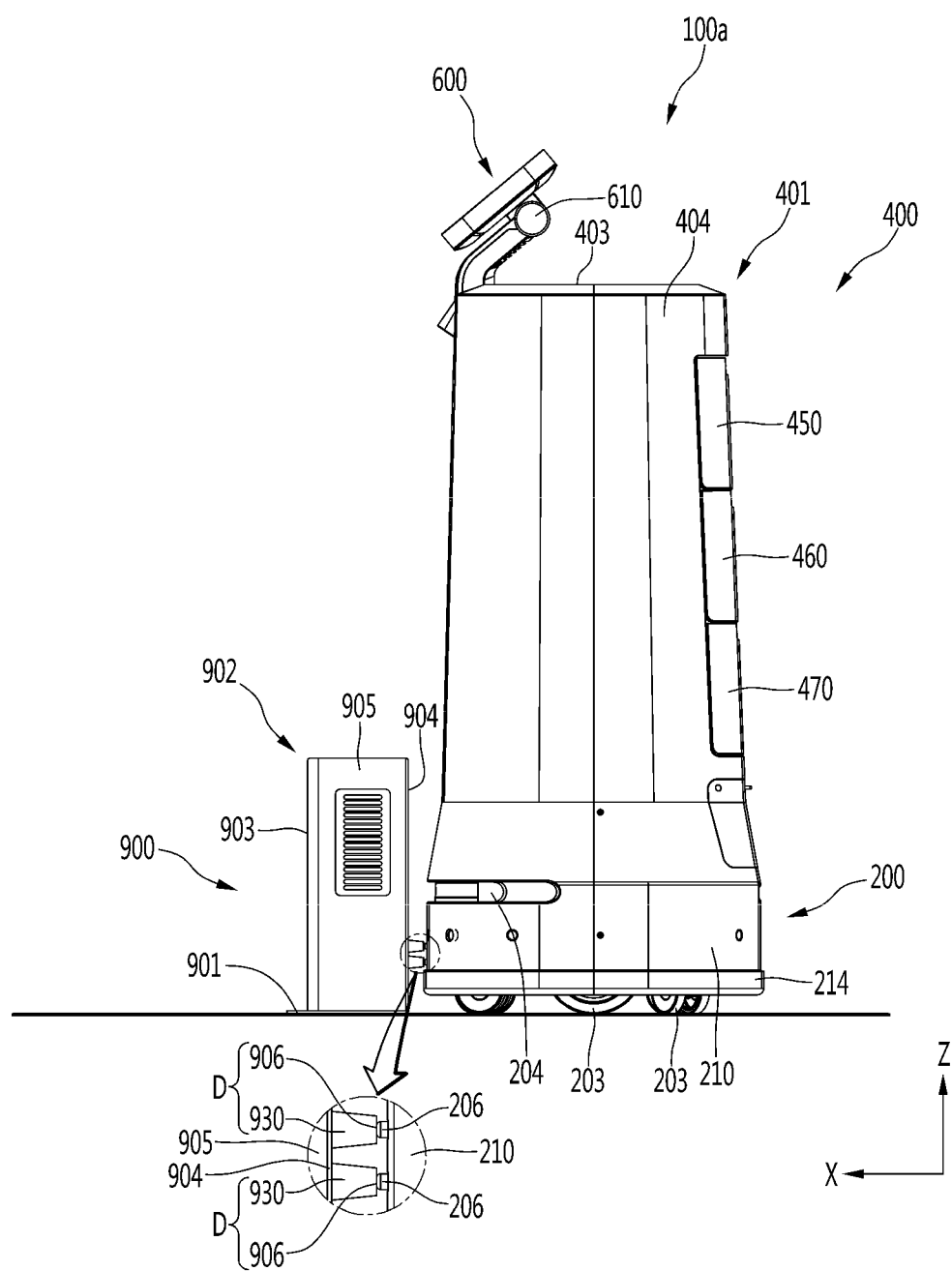
FIG. 16 is a side view when the charging terminal of the robot shown in FIG. 15 starts to be brought into contact with the supply terminal of the charging station.
Figure 17:
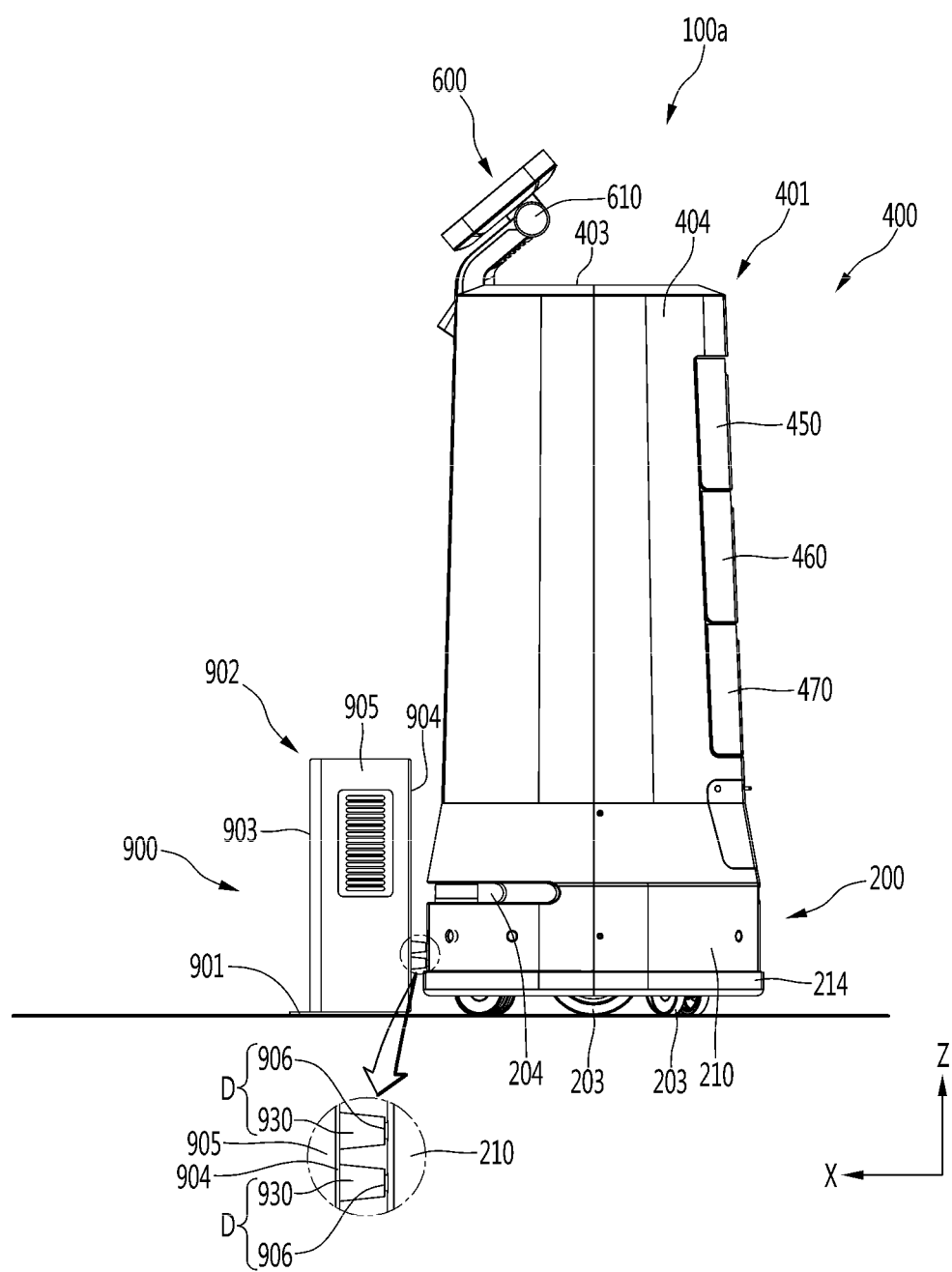
FIG. 17 is a side view when the charging terminal shown in FIG. 16 is pushed before the supply terminal.
Figure 18:
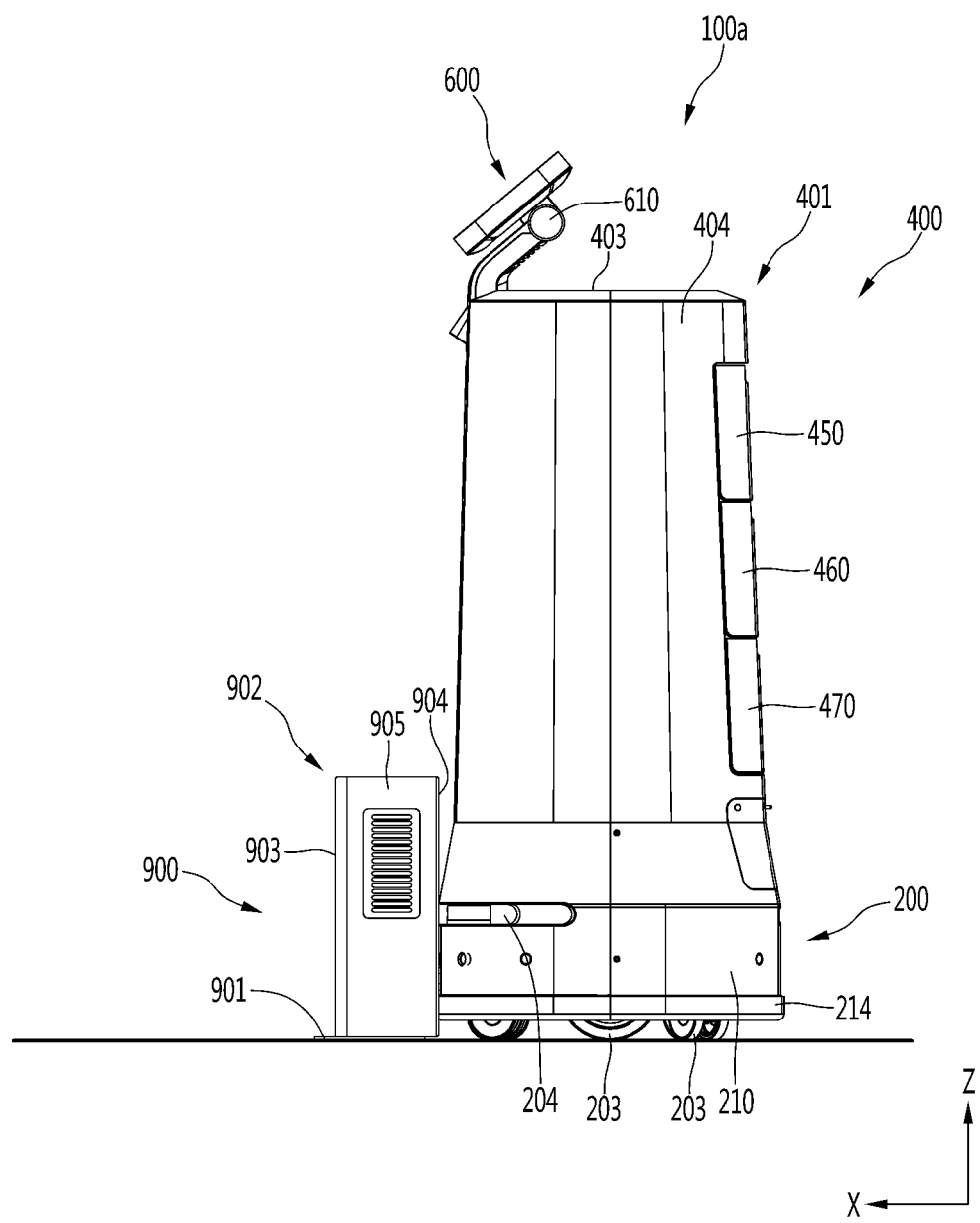
FIG. 18 is a side view when the supply terminal shown in FIG. 17 is pushed.

FIG. 15 is a side view when a robot according to an embodiment of the present disclosure travels toward a charging station, FIG. 16 is a side view when the charging terminal of the robot shown in FIG. 15 starts to be brought into contact with the supply terminal of the charging station, FIG. 17 is a side view when the charging terminal shown in FIG. 16 is pushed before the supply terminal, and FIG. 18 is a side view when the supply terminal shown in FIG. 17 is pushed.

The robot system may include a robot 100a and a charging station 900 for charging the robot 100a.

As shown in FIGS. 15 to 18, the robot 100a may be moved to the charging station 900 and docked at the charging station 900. When the robot 100a is completely docked at the charging station 900, the robot 100a may be charged by the charging station 900.

The charging terminal 206 of the robot 100a may be disposed to protrude in the outward direction of the robot 100a. More specifically, the charging terminal 206 may be disposed penetrate through the lower housing 210 of the mobile robot 200, and a portion (for instance, a front portion) of the charging terminal 206 may be located outside the lower housing 210.

The charging terminal 206 may be disposed in the mobile robot 200 to be movable in a horizontal direction. When the robot 100a is moved to the charging station 900 and is docked at a charging station 900, the charging terminal 206 may be pushed by the charging station 900 in the inward direction of the robot 100a and, more particularly, in the inward direction of the mobile robot 200. The charging terminal 206 may be disposed at the front portion of the robot 100a to be movable in the horizontal direction and, more particularly, in the front-and-rear direction X.

The charging station 900 may include a base 901 and a case 902 disposed above the base 901.

The case 902 may include a front case 903 and a rear case 904 spaced apart from each other in the front-and-rear direction X, and may include a side case 905 connecting the front case 903 with the rear case 904.

A surface facing the robot 100a of the charging station 900 may be defined as a rear surface based on a direction X in which the robot 100a is docked at the charging station 900, and an opposite surface of the rear surface may be defined as a front surface.

The charging station 900 may be provided with a supply terminal 906 connected with the charging terminal 206. The supply terminal 906 may be disposed to protrude from the outer surface of the charging station 900 in the outward direction of the charging station 900. The supply terminal 906 may be disposed to protrude from the case 902 of the charging station 900 in the outward direction. The supply terminal 906 may be disposed on the rear case 904 of the case 902 in the horizontal direction and, more particularly, in the front-and-rear direction X.

The charging terminal 206 may be brought into contact with and connected to the supply terminal 906 in the movement direction of the robot 100a.

The charging station 900 may further include a supply terminal mounter 930 surrounding the outer circumferential surface of the supply terminal 906, and the supply terminal mounter 930 may configure a supply terminal assembly D together with the supply terminal 906. The supply terminal assembly D may be disposed on the rear case 904 of the case 902 to be movable in the horizontal direction and, more particularly, in the front-and-rear direction X.

In the charging terminal 206 and the supply terminal 906 configured as described above, when the robot 100a approaches the charging station 900 for charging, the front end of the charging terminal 206 may be brought into contact with the rear end of the supply terminal 906 in the front-and-rear direction X.

Traveling of the robot 100a may be stopped after the charging terminal 206 starts to be brought into contact with the supply terminal 906. When the charging terminal 206 has moved (e.g., has retreated) by a predetermined distance (e.g., such as a maximum stroke or maximum amount) after the charging terminal 206 starts to be brought into contact with the supply terminal 906, the driving wheels 202 may be stopped.

That is, the robot 100*a* does not stop immediately after the charging terminal 206 is brought into contact with the supply terminal 906, but may further travel and then stop after the charging terminal 206 starts to be brought into contact with the supply terminal 906.

When the charging terminal 206 has moved by a maximum amount, the robot 100*a* may stop the driving wheels 202. In the robot 100*a*, a sensor or switch capable of sensing completion of movement of the charging terminal 206 may be provided, and, when the sensor or switch senses completion of movement of the charging terminal 206, the robot 100*a* may stop the driving wheels 202.

The sensor or the switch (hereinafter referred to as a switch) may sense whether the charging terminal 206 has moved by a maximum amount, and the processor 180 of the robot 100*a* may transmit a stop signal to the driving motor 201, when completion of movement of the charging terminal 206 is sensed by the sensor or the switch.

The robot 100*a* may further travel during a first time when the signal of the switch is transmitted to the processor 180, a second time when the processor 180 receives the signal of the switch and then transmits the stop signal to the driving motor 201, and a third time when the driving motor 201 receives the stop signal to stop the driving wheels 202. During these times, external force applied through the charging terminal 206 may be transmitted to the charging station 900.

In the robot system, the supply terminal assembly D may be moved after the charging terminal 206 has moved by the maximum amount, and the supply terminal assembly D may move into the charging station 900.

Figure 19:
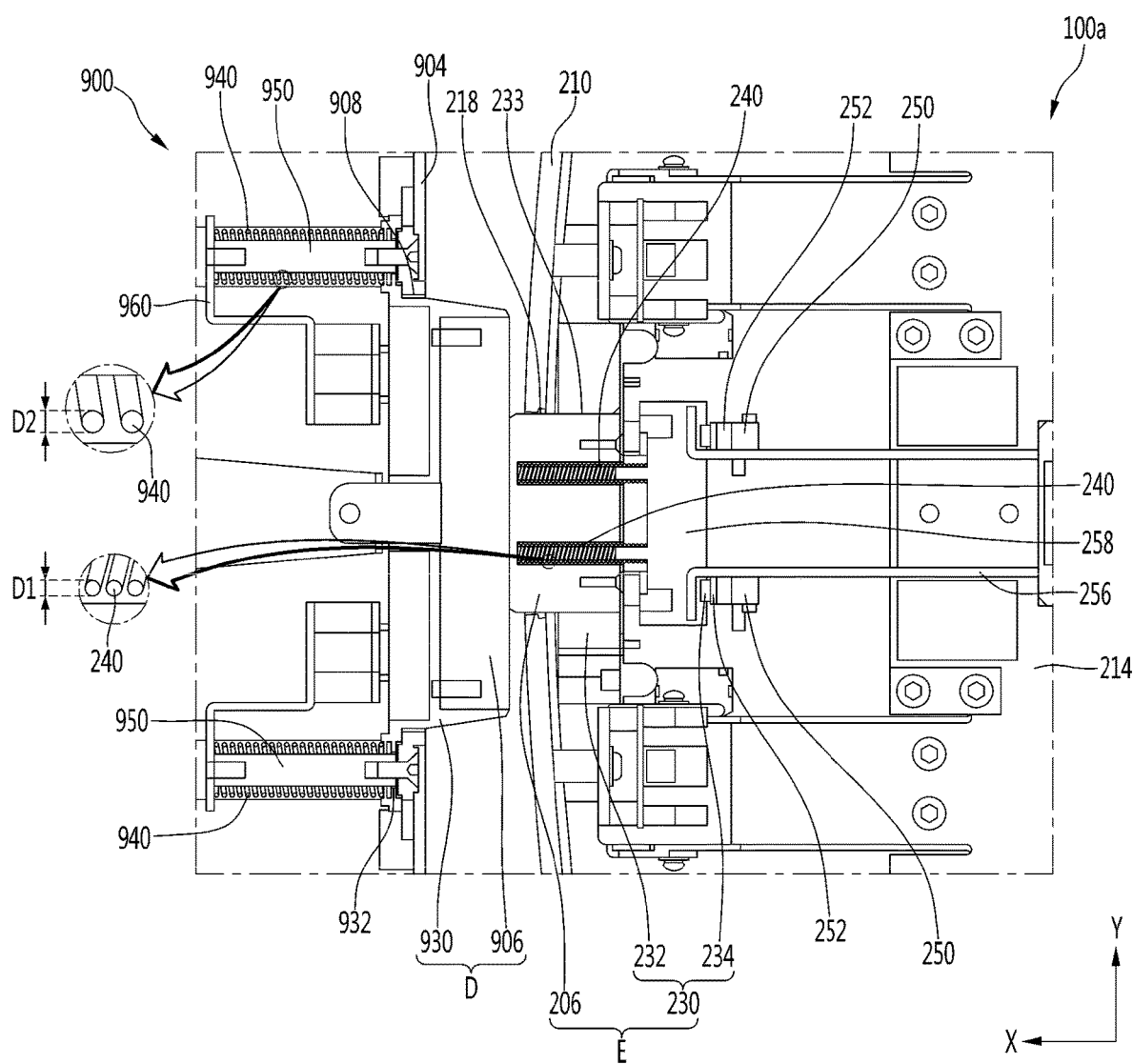
FIG. 19 is a cross-sectional view when the charging terminal of the robot according to the embodiment of the present disclosure starts to be brought into contact with the supply terminal of the charging station.
Figure 20:
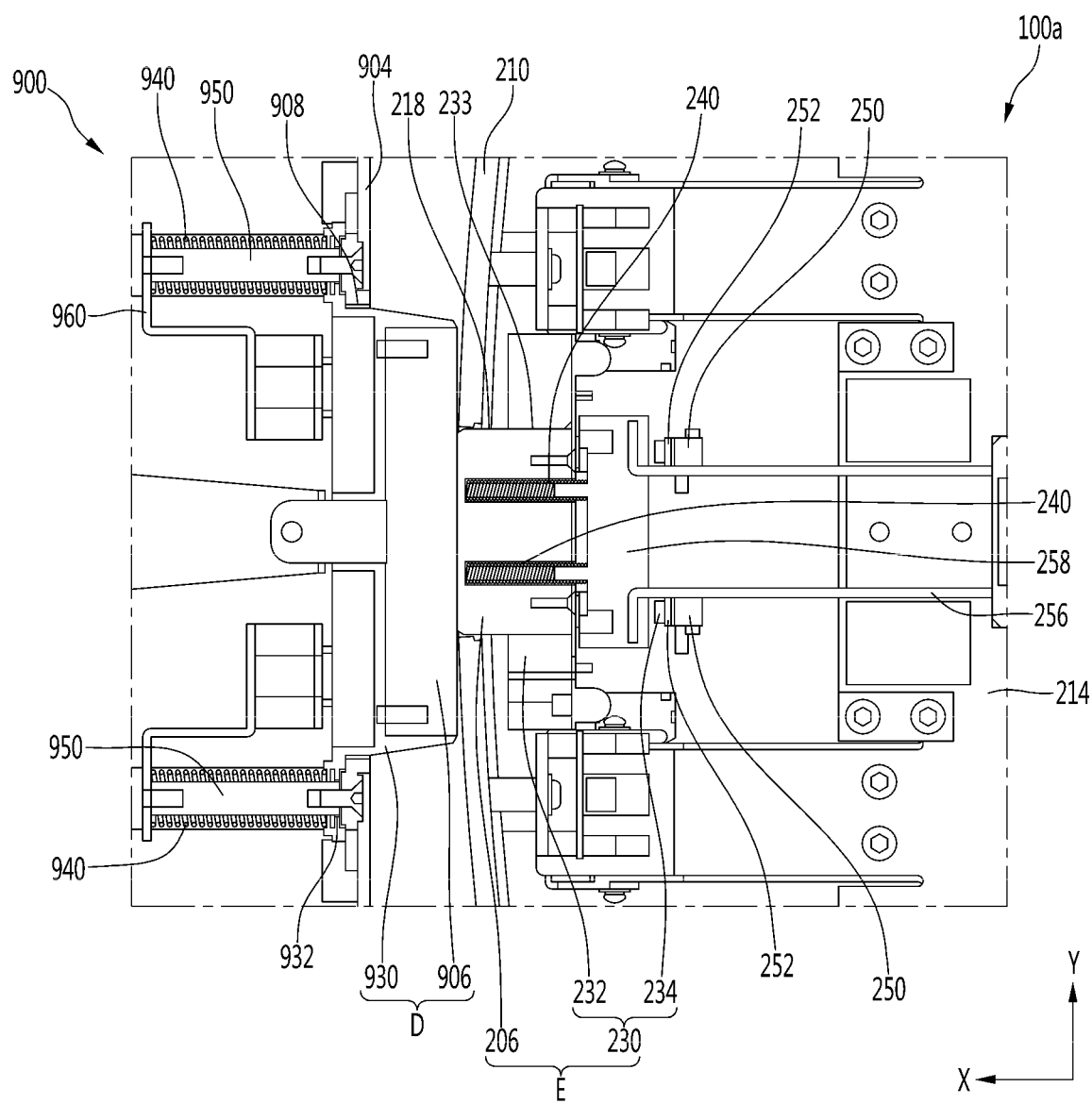
FIG. 20 is a cross-sectional view when the charging terminal shown in FIG. 19 is pressed, a first spring is compressed, and a switch is switched.
Figure 21:
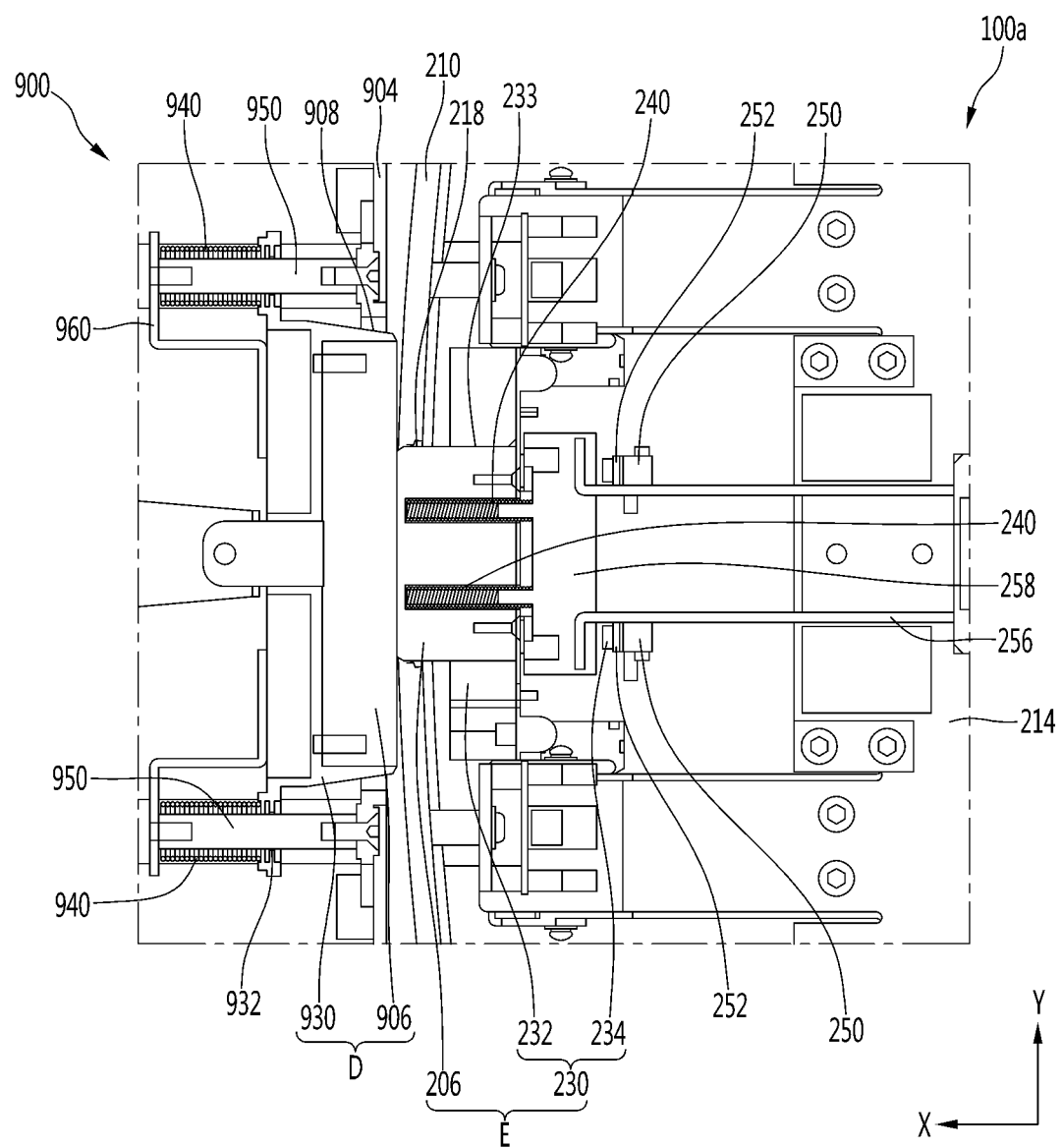
FIG. 21 is a cross-sectional view when the supply terminal shown in FIG. 20 is pressed and a second spring is compressed.

FIG. 19 is a cross-sectional view when the charging terminal of the robot according to the embodiment of the present disclosure starts to be brought into contact with the supply terminal of the charging station, FIG. 20 is a cross-sectional view when the charging terminal shown in FIG. 19 is pressed, a first spring is compressed, and a switch is switched, and FIG. 21 is a cross-sectional view when the supply terminal shown in FIG. 20 is pressed and a second spring is compressed.

The charging terminal 206 may be disposed in the charging terminal mounter 230, and the charging terminal 206 and the charging terminal mounter 230 may configure a charging terminal assembly E.

The charging terminal assembly E may be disposed in the robot 100*a* to be movable in the horizontal direction and, more particularly, in the front-and-rear direction X.

In the charging terminal assembly E, the charging terminal 206 of the inside may be made of a conductive material and the charging terminal mounter 230 of the outside may be made of an insulating material.

The charging terminal 206 may be brought into contact with/connected to the supply terminal 906 of the charging station 900 in the traveling direction of the robot 100*a*.

The charging terminal 206 may be disposed to penetrate through a terminal through-hole 218 formed in the lower housing 210 of the robot 100*a*, and a front portion of the charging terminal 206 may be disposed outside the terminal through-hole 218.

The robot 100*a* may further include a first spring 240 and a switch 250.

The first spring 240 may support the charging terminal 206 such that a front portion of the charging terminal 206 is disposed outside the robot 100*a* and, more particularly, outside the terminal through-hole 218.

The switch 250 may be disposed to be switched by the charging terminal mounter 230, when the charging terminal 206 is moved by the maximum amount.

The charging terminal mounter 230 may protect the charging terminal 206 and switch the switch 250.

The charging terminal mounter 230 may include a main mounter 232 and a push body 234.

In the main mounter 232, an opening 233 surrounding the outer circumference of the charging terminal 206 may be formed. The opening 233 may surround the upper surface, the lower surface, the right surface and the left surface of the charging terminal 206.

The front surface of the charging terminal 206 may not be surrounded by the opening 233 and may be exposed to the outside.

The push body 234 may extend from the main mounter 232 and may be disposed in front of the switch terminal 252 of the switch 250, thereby pressing the switch terminal 252 of the switch 250 when the charging terminal mounter 230 retreats toward the inside of the robot 100*a*. The push body 234 may be bent at least once. The rear end of the push road 234 may be disposed in front of the switch 250 to be movable in the front-and-rear direction X.

The first spring 240 may elastically support the charging terminal 206 in the outward direction (in the front/forward direction), and the first spring 240 may elastically support the charging terminal 206 such that the charging terminal 206 protrudes to the outside of the outer circumferential surface of the robot 100*a* when there is no external force.

The charging terminal 206 may be configured to protect the first spring 240 and the charging terminal 206 may be formed with a spring reception portion having an open rear surface. The spring reception portion may have a closed front surface.

The first spring 240 may be inserted into and accommodated in the spring reception portion. An example of the first spring 240 may include a coil spring.

The front end of the first spring 240 may be in contact with the charging terminal 206. The rear end of the first spring 240 may be supported by a spring guide 258. The first spring 240 may be compressed or expanded in a state of being disposed inside the charging terminal 206.

The first spring 240 may be compressed or expanded in the front-and-rear direction between the spring guide 258 and the charging terminal 206.

The first spring 240 may elastically support the charging terminal 206 in the outward direction of the robot 100*a*, before the robot 100*a* is docked at the charging station 900. In contrast, when the charging terminal 206 is brought into contact with the supply terminal 906 and the charging terminal 206 is pushed rearward, the first spring 240 may be pushed and compressed by the charging terminal 206, and the first spring 240 may guide the charging terminal 206 while absorbing external impact, such that the charging terminal 206 may be moved in the inward direction of the robot 100*a*.

The switch 250 may be switched by the charging terminal mounter 230 and, more particularly, by the push body 234, when the charging terminal mounter 230 retreats. Retreat of the charging terminal mounter 230 may mean that the charging terminal assembly E moves toward the center of the inside of the robot 100*a*.

An example of the switch 250 may include a micro switch (e.g., a snap switch) or a limit switch or the like.

The switch 250 may include a switch terminal 252 pressed by the push body 234 and a fixed terminal, with which the switch terminal is brought into contact.

When the push rod 234 retreats, the switch terminal 252 of the switch 250 may be brought into contact with the fixed terminal and the switch 250 may be switched.

When the switch 250 is switched by the charging terminal mounter 230, the processor 180 of the robot 100a may sense switching of the switch 250 and generate a stop signal for stopping the driving wheels 202. The stop signal may be transmitted to the driving motor 201.

That is, when the switch terminal 252 is brought into contact with the fixed terminal, the switch 250 may be turned on, a signal, which has passed through the switch 250, may be applied to the processor 180 of the robot 100a, and the processor 180 of the robot 100a may generate and transmit the stop signal for stopping the driving motor 201 to the driving motor 201.

The robot 100a may further include a robot bracket 256 having the switch 250 installed thereon and a spring guide 258 supporting the first spring 240.

The robot bracket 256 may be mounted on a base plate 214, and the switch 250 may be located behind the push rod 234 in a state of being supported by the robot bracket 256.

The spring guide 258 may be a sheet or a spring supporter supporting the first spring 240, and a spring support shaft supporting the other end of the first spring 240 may protrude in the forward direction.

The charging station 900 may include the supply terminal 906 connected with the charging terminal 206, and the supply terminal 906 may be disposed in the supply terminal mounter 930.

The supply terminal 906 and the supply terminal mounter 930 may configure the supply terminal assembly D.

In the supply terminal assembly D, the supply terminal 906 of the inside may be made of a conductive material and the supply terminal mounter 930 of the outside may be made of an insulating material.

The length of the supply terminal 906 in the left-and-right direction Y may be greater than that of the charging terminal 206 in the left-and-right direction Y. The supply terminal 906 may have a bar shape in the left-and-right direction.

The supply terminal mounter 930 may surround the upper surface, the lower surface, the left surface and the right surface of the supply terminal 906. The rear surface of the supply terminal 906 may not be surrounded by the supply terminal mounter 930, but may be exposed to the outside.

The supply terminal assembly D may be disposed to penetrate through the terminal through-hole 908 formed in the case 902 of the charging station 900, and the rear portion of the supply terminal assembly D may be disposed to be exposed to the outside of the terminal through-hole 908.

The charging station 900 may include a second spring 940. The second spring 940 may elastically support the supply terminal mounter 930 in the outward direction (in the rearward direction).

The second spring 940 may elastically support the supply terminal mounter 930 in the rearward direction in front of the supply terminal mounter 930. An example of the second spring 940 may include a coil spring.

The charging station 900 may include a supply terminal shaft 950 for guiding movement of the supply terminal mounter 930, and a station bracket 960 connected to the supply terminal shaft 950 to support the second spring 940.

In the supply terminal mounter 930, a guide hole 932 guided along the outer circumference of the supply terminal shaft 950 may be formed.

The front end of the second spring 940 may be brought into contact with the station bracket 960, and the rear end of the second spring 940 may be brought into contact with the supply terminal mounter 930. The rear end of the second spring 940 may be brought into contact with the periphery of the guide hole 932 of the supply terminal mounter 930. The second spring 940 may be compressed or expanded in the front-and-rear direction between the station bracket 960 and the supply terminal mounter 930.

The second spring 940 may elastically support the supply terminal mounter 930 such that the supply terminal mounter 930 and the supply terminal 906 protrude to the outside of the outer surface of the charging station 900, when there is no external force.

The second spring 940 may elastically support the supply terminal 906 and the supply terminal mounter 930 in the outward direction of the charging station 900, before the robot 100a is docked at the charging station 900. The second spring 940 may be pushed and compressed by the supply terminal mounter 930 after the charging terminal 206 is brought into contact with the supply terminal 906, and the second spring 940 may be compressed while absorbing impact such that the supply terminal 906 is moved and compressed in the inward direction of the charging station 900.

The first spring 240 may apply, to the charging terminal 206, elastic force for pushing the charging terminal 206 in the outward direction of the robot 100a, and the second spring 940 may apply, to the supply terminal 906, elastic force for pushing the supply terminal 906 in the outward direction of the charging station 900.

The first spring 240 and the second spring 940 may determine the order in which the charging terminal 206 and the supply terminal 906 are moved by difference in elastic force for pushing the charging terminal 206 or the supply terminal 906.

When the first spring 240 is compressed more easily than the second spring 940, the charging terminal 206 may be moved before the supply terminal 906, and the supply terminal 906 may be moved after the charging terminal 206 is moved.

When the charging terminal 206 is brought into contact with the supply terminal 906 while the robot 100a travels, the first spring 240 may be compressed before the second spring 940.

As an example of the second spring 940, after the first spring 240 starts to be compressed, while the first spring 240 is being compressed, the second spring 940 may start to be compressed.

As another example of the second spring 940, after the first spring 240 is maximally compressed, the second spring 940 may start to be compressed.

Here, maximum compression of the first spring 240 may mean that the supply terminal mounter 230 is moved by a contact position for switching the switch 250, as shown in FIG. 20.

Maximum elastic force of the first spring 240 may be less than minimum elastic force of the second spring 940.

Maximum elastic force of the first spring 240 may refer to elastic force generated in the first spring 240 when the charging terminal 206 and the charging terminal mounter 230 are maximally moved.

Minimum elastic force of the second spring 906 may refer to elastic force generated in the second spring 906 when the movement of the charging terminal 906 is 0 or is a minimum.

The materials of the first spring 240 and the second spring 940 may be the same, and the first spring 240 and the second spring 940 may be configured to have a difference in compression order (difference in elastic force) as described above.

As shown in FIG. 19, the cross-sectional diameter D1 of the first spring 240 may be less than the cross-sectional diameter D2 of the second spring 940. When the cross-sectional diameter D1 of the first spring 240 is less than the cross-sectional diameter D2 of the second spring 940, the first spring 240 may be compressed before the second spring 940, and the second spring 940 may start to be compressed after compression of the first spring 240 is completed.

The second spring 940 may start to be compressed after the first spring 240 has been maximally compressed, and the second spring 940 may elastically support the supply terminal mounter 930 while being compressed, such that the supply terminal 906 and the supply terminal mounter 930 are moved toward the inside of the charging station 900.

Compression of the second spring 940 may continue until the switch 250 is switched and stopping of the driving wheels 202 is completed, and the second spring 940 may absorb impact without applying excessive force to the supply terminal 906.

According to the embodiment of the present disclosure, the first spring installed in the robot may elastically support the charging terminal in the outward direction, thereby absorbing impact which may be generated while the robot is docked at the charging station and protecting the charging terminal.

In addition, since the first spring of the robot is compressed before the second spring of the charging station when the robot is docked and the switch is switched to stop the driving wheels when the first spring is compressed, it is possible to minimize damage to the charging terminal and the supply terminal while the robot does not apply excessive force to the charging station until the switch is switched after the charging terminal is first brought into contact with the supply terminal.

In addition, since the supply terminal may be buffered while the second spring is compressed until stopping of the driving wheels is completed after the switch is switched, it is possible to minimize damage to the robot or the charging station which may occur when excessive external force is applied to the supply terminal.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the disclosure but by the appended claims, and all differences within the scope will be construed as being included in the present disclosure.

What is claimed is:

1. A robot, comprising:
   a battery;
   a driving wheel;
   a charging terminal for charging the battery;
   a charging terminal mounter, the charging terminal being disposed in the charging terminal mounter;
   a first spring configured to elastically support the charging terminal in an outward direction;
   a switch configured to be closed by displacement of the charging terminal mounter when the charging terminal mounter retracts; and
   a processor configured to stop the driving wheel when the switch is closed by the charging terminal mounter.

2. The robot according to claim 1, wherein the charging terminal protrudes outside of an outer circumferential surface of the robot due to the elastic support from the first spring.

3. The robot according to claim 1, further comprising a lidar sensor,
   wherein a height of the charging terminal is lower than a height of the lidar sensor.

4. The robot according to claim 1, wherein the charging terminal mounter includes:
   a main mounter having an opening surrounding an outer circumference of the charging terminal; and
   a push body extending from the main mounter and configured to press a switch terminal of the switch.

5. The robot according to claim 1, further comprising:
   a robot bracket, wherein the switch is attached to the robot bracket; and
   a spring guide configured to support the first spring.

6. A robot system, comprising:
   a robot including:
     a driving wheel;
     a battery;
     a charging terminal mounter; and
     a charging terminal disposed in the charging terminal mounter; and
   a charging station including:
     a supply terminal mounter;
     a supply terminal configured to be connected with the charging terminal and disposed in the supply terminal mounter; and
     a second spring configured to elastically support the supply terminal mounter in a rearward direction,
   wherein the robot further includes:
     a first spring configured to elastically support the charging terminal in a forward direction, the forward direction being opposite to the rearward direction;
     a switch configured to be turned on by the charging terminal mounter when the charging terminal mounter retracts; and
     a processor configured to stop the driving wheel when the switch is turned on by the charging terminal mounter.

7. The robot system according to claim 6, wherein the second spring starts to compress after the first spring is maximally compressed.

8. The robot system according to claim 6, wherein each of the first spring and the second spring is a coil spring, and
   wherein a cross-sectional diameter of the first spring is less than a cross-sectional diameter of the second spring.

9. The robot system according to claim 6, wherein the charging terminal protrudes outside of an outer circumferential surface of the robot due to the elastic support from the first spring.

10. The robot system according to claim 6, wherein the robot further includes a lidar sensor, and
    wherein a height of the charging terminal is lower than a height of the lidar sensor.

11. The robot system according to claim 6, wherein the charging terminal mounter includes:
    a main mounter having an opening surrounding an outer circumference of the charging terminal; and a push body extending from the main mounter and configured to press a switch terminal of the switch.

12. The robot system according to claim 6, wherein the robot further includes:
   a robot bracket, wherein the switch is attached to the robot bracket; and
   a spring guide configured to support the first spring.

13. The robot system according to claim 6, wherein the supply terminal mounter and the supply terminal protrude to outside of an outer circumferential surface of the charging station due to the elastic support from the second spring.

14. The robot system according to claim 6, wherein the charging station further includes:
   a supply terminal shaft configured to guide movement of the supply terminal mounter; and
   a station bracket connected to the supply terminal shaft to support the second spring.

15. The robot system according to claim 14, wherein the supply terminal mounter includes a guide hole, and
   wherein an outer circumference of the supply terminal shaft is guided along the guide hole of the supply terminal mounter.

16. A robot system, comprising:
   a robot including:
      a driving wheel;
      a charging terminal mounter; and
      a charging terminal disposed in the charging terminal mounter; and
   a charging station including:
      a supply terminal mounter;
      a supply terminal configured to be connected with the charging terminal and disposed in the supply terminal mounter; and
      a spring configured to elastically support the supply terminal mounter,
      wherein the supply terminal protrudes outward from an outer circumferential surface of the charging station by the elastic support of the spring.

17. The robot system of claim 16, wherein the supply terminal protrudes horizontally.

18. The robot system of claim 17, wherein the supply terminal has a bar shape in a left-right direction.

19. The robot system of claim 17, wherein a length of the supply terminal in a left-right direction is greater than a length of the charging terminal in the left-right direction.

20. The robot system according to claim 17, wherein the robot further includes a lidar sensor, and
   wherein the charging terminal is located lower than the lidar sensor.

* * * * *